United States Patent
Zhang et al.

(10) Patent No.: US 10,259,390 B2
(45) Date of Patent: Apr. 16, 2019

(54) SYSTEMS AND METHODS FOR TOWING VEHICLE AND TRAILER WITH SURROUND VIEW IMAGING DEVICES

(71) Applicant: GM GLOBAL TECHNOLOGY OPERATIONS LLC, Detroit, MI (US)

(72) Inventors: Wende Zhang, Troy, MI (US); Jinsong Wang, Troy, MI (US); Esther Anderson, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 215 days.

(21) Appl. No.: 15/592,913

(22) Filed: May 11, 2017

(65) Prior Publication Data

US 2017/0341583 A1 Nov. 30, 2017

Related U.S. Application Data

(60) Provisional application No. 62/342,671, filed on May 27, 2016.

(51) Int. Cl.
*H04N 5/00* (2011.01)
*B60R 1/00* (2006.01)
(Continued)

(52) U.S. Cl.
CPC .............. *B60R 1/003* (2013.01); *B60R 1/00* (2013.01); *G06T 7/73* (2017.01); *H04N 5/23238* (2013.01); *H04N 7/181* (2013.01); *B60R 2300/102* (2013.01); *B60R 2300/105* (2013.01); *B60R 2300/302* (2013.01); *B60R 2300/303* (2013.01); *B60R 2300/307* (2013.01); *B60R 2300/607* (2013.01); *B60R 2300/80* (2013.01);
(Continued)

(58) Field of Classification Search
CPC .......... B60Q 1/00; B60Q 1/22; B60Q 1/2665; B60Q 1/503; B60Q 1/54; H04N 7/18; G01S 15/931; G01S 2013/9364; G08G 1/16; B60C 23/00; B60C 23/0408; B60K 35/00; B60K 37/06; B60R 1/00; B60R 1/04
See application file for complete search history.

(56) References Cited

U.S. PATENT DOCUMENTS 6,198,409 B1 * 3/2001 Schofield .................. B60R 1/12
 280/728.1
6,392,315 B1 * 5/2002 Jones ...................... F02P 3/053
 123/597

(Continued)

*Primary Examiner* — Frank F Huang
(74) *Attorney, Agent, or Firm* — Lorenz & Kopf LLP

(57) ABSTRACT

Systems and method are provided for a towing vehicle towing a trailer having at least one imaging device. A method includes: receiving, from a first imaging device coupled to the trailer, a first image stream having a plurality of first images; receiving, from a second imaging device coupled to the vehicle, a second image stream having a plurality of second images; determining, at least one common feature between a first image of the first images and a second image of the second images; determining a first distance from the first imaging device to the at least one common feature and a second distance from the second imaging device to the at least one common feature; and determining, a position of the first imaging device relative to the vehicle based on the first distance, the second distance and a known position and pose of the second imaging device.

20 Claims, 15 Drawing Sheets

(51) Int. Cl.
*G06T 7/73* (2017.01)
*H04N 5/232* (2006.01)
*H04N 7/18* (2006.01)

(52) U.S. Cl.
CPC ............... *G06T 2207/10012* (2013.01); *G06T 2207/30252* (2013.01)

(56) References Cited

U.S. PATENT DOCUMENTS

| | | | | |
|---|---|---|---|---|
| 6,720,920 | B2* | 4/2004 | Breed | B60N 2/2863 342/357.31 |
| 7,079,017 | B2* | 7/2006 | Lang | G01S 15/931 340/435 |
| 7,579,940 | B2* | 8/2009 | Schofield | B60C 23/00 340/425.5 |
| 2002/0167589 | A1* | 11/2002 | Schofield | B60N 2/002 348/148 |
| 2005/0134983 | A1* | 6/2005 | Lynam | B60R 1/12 359/872 |
| 2007/0073473 | A1* | 3/2007 | Altan | G01S 13/726 701/518 |
| 2007/0181810 | A1* | 8/2007 | Tan | G01S 7/4811 250/341.1 |
| 2014/0277942 | A1* | 9/2014 | Kyrtsos | G01B 21/02 701/41 |
| 2015/0332098 | A1 | 11/2015 | Wang et al. | |
| 2015/0332446 | A1 | 11/2015 | Wang et al. | |

* cited by examiner

US 10,259,390 B2

SYSTEMS AND METHODS FOR TOWING VEHICLE AND TRAILER WITH SURROUND VIEW IMAGING DEVICES

CROSS-REFERENCE TO RELATED APPLICATION

This application claims the benefit of U.S. Provisional Application No. 62/342,671, filed on May 27, 2016, which is incorporated herein by reference.

TECHNICAL FIELD

The present disclosure generally relates to vehicles and more particularly relates to systems and methods for a towing vehicle and a trailer with surround view imaging devices for the determination of towing vehicle and trailer dynamics, generation of a view of a rear of a towing vehicle with a transparent trailer, and generation of a bird-eye 360 degree surround view of the towing vehicle and/or the trailer.

INTRODUCTION

Generally, certain vehicles, such as motor vehicles, may be used for towing different types of objects, which may be mounted on a trailer. For example, a motor vehicle may tow a boat, a recreation vehicle, a trailer filled with one or more objects, etc. During the operation of a towing vehicle with a trailer, it may be difficult to view an environment surrounding the vehicle and/or the trailer. Moreover, while operating the towing vehicle, it may be difficult to determine trailer dynamics, such as whether the trailer is pivoting or rolling relative to the vehicle, for example.

Accordingly, it is desirable to provide systems and methods for a towing vehicle and a trailer with surround view imaging devices, which determine towing vehicle and trailer dynamics, generate a full view of a rear of a towing vehicle with a transparent trailer, and generate a bird-eye 360 degree surround view of the towing vehicle and the trailer. Furthermore, other desirable features and characteristics of the present disclosure will become apparent from the subsequent detailed description and the appended claims, taken in conjunction with the accompanying drawings and the foregoing technical field and background.

SUMMARY

Systems and method are provided for a towing vehicle towing a trailer having at least one imaging device. In one embodiment, a method includes: receiving, from a first imaging device coupled to the trailer, a first image stream having a plurality of first images; receiving, from a second imaging device coupled to the towing vehicle, a second image stream having a plurality of second images; determining, by a processor onboard the towing vehicle, at least one common feature between a first image of the plurality of first images and a second image of the plurality of second images; determining, by the processor onboard the towing vehicle, a first distance from the first imaging device coupled to the trailer to the at least one common feature and a second distance from the second imaging device coupled to the towing vehicle to the at least one common feature; and determining, by the processor onboard the towing vehicle, a position of the first imaging device relative to the towing vehicle based on the first distance, the second distance and a known position and pose of the second imaging device on the towing vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the vehicle system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
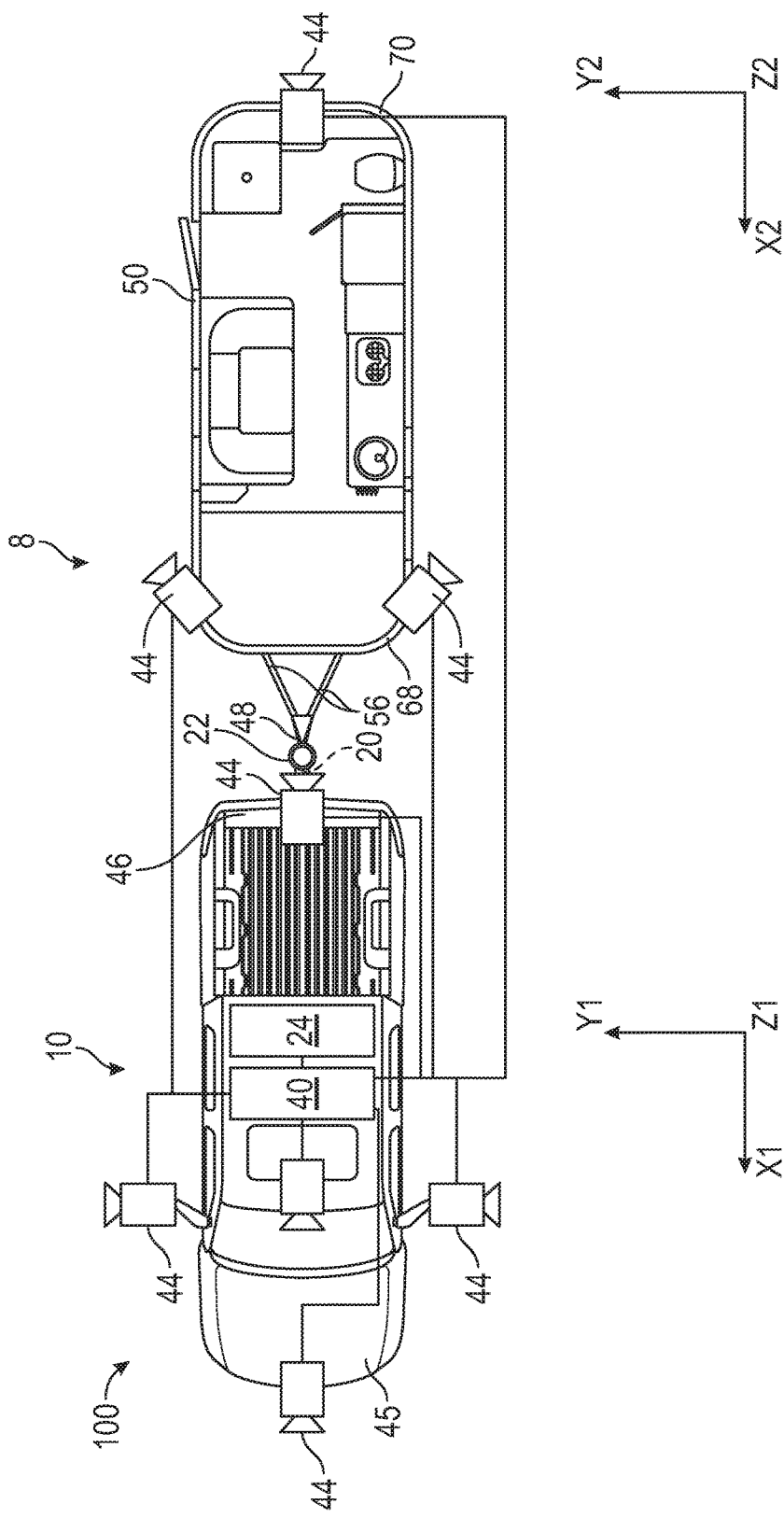
FIG. 1 is a schematic illustration of a towing vehicle coupled to and towing a trailer, and the vehicle includes a trailer imaging system in accordance with various embodiments.

With reference to FIG. 1, a trailer imaging system shown generally at 100 is associated with a towing vehicle 10 and a trailer 8 in accordance with various embodiments. In general, the trailer imaging system 100 generates a full view of an environment behind a towing vehicle when a trailer is attached to the towing vehicle; generates a bird-eye or 360 degree view of an environment surrounding the towing vehicle and/or the trailer; determines one or more dynamics associated with the trailer, such as a pitch, pivot and/or roll of the trailer; and outputs one or more alerts based on this determination. The trailer imaging system 100 may also determine one or more obstacles within the environment surrounding the towing vehicle and/or trailer and may generate one or more alerts based on the determination. The trailer imaging system 100 may also output one or more control signals to one or more actuators associated with the towing vehicle based on one or more of the determined dynamics of the trailer. By generating the full view of the environment and the bird-eye or 360 degree view about the towing vehicle and/or trailer, the operator is able to see one or more operating conditions of the trailer. For example, the operator is able to view the lane the trailer is traveling, whether the trailer will navigate about a curve, whether one or more obstacles are near the trailer and/or behind the trailer, and is provided with a clear field of view when backing up the towing vehicle with the trailer attached. Moreover, by determining the dynamics of the trailer, such as the pivot, pitch and roll, the operator may be notified of an undesirable characteristic of the trailer, such as an overloading, sway, etc.

As depicted in FIG. 1, the towing vehicle 10 is coupled to a trailer 8. The towing vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The vehicle wheels 16-18 are each rotationally coupled to the chassis 12 near a respective corner of the body 14.

In various embodiments, the trailer imaging system 100 is incorporated into the vehicle 10 (hereinafter referred to as the vehicle 10). In certain embodiments, the vehicle 10 may be an autonomous vehicle that is capable of sensing its environment and navigating with little or no user input. The vehicle 10 is depicted in the illustrated embodiment as a truck, but it should be appreciated that any other vehicle including motorcycles, passenger cars, sport utility vehicles (SUVs), recreational vehicles (RVs), marine vessels, aircraft, etc., can also be used. Furthermore, the teachings herein are not limited to use only with automobiles but rather, may be used with other types of vehicles as well. For example, the teachings herein may be compatible with vehicles including, but not limited to, aircraft, railway cars, commercial vehicles including tractors, aircraft tugs, aircraft pushback tugs, forklifts, etc.

Figure 2:
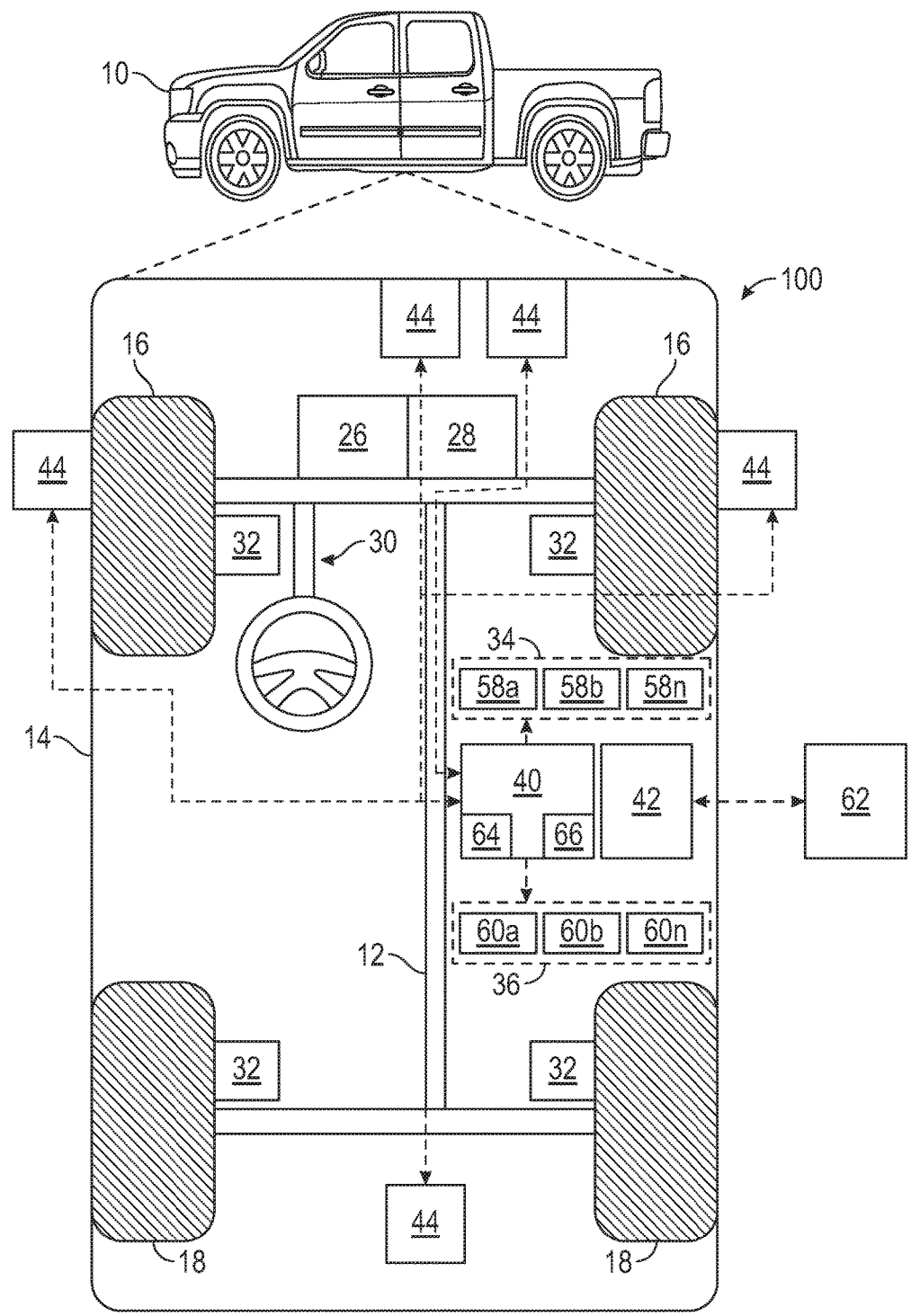
FIG. 2 is a functional block diagram illustrating the towing vehicle of FIG. 1 having the trailer imaging system, in accordance with various embodiments.

As shown, with reference to FIGS. 1 and 2, the vehicle 10 generally includes a hitch receiver 20, a hitch ball 22, a driver communication system 24, a propulsion system 26, a transmission system 28, a steering system 30, a brake system 32, a sensor system 34, an actuator system 36, at least one controller 40 and a communication system 42. As will be discussed, the towing vehicle 10 and the trailer 8 also include one or more cameras 44. With reference to FIG. 1, the hitch receiver 20 is coupled to a rear 46 of the vehicle 10, and generally is coupled to a frame of the vehicle 10. The hitch receiver 20 defines a cavity or slot, which receives the hitch ball 22. The hitch ball 22 is generally locked into the hitch receiver 20 such that the hitch ball 22 is fixed within the slot. The hitch ball 22 receives a tongue 48 of the trailer 8. It should be noted that the hitch ball 22 need not comprise a ball, but rather, may comprise a pintle hook, gooseneck hitch, fifth wheel hitch, etc. The tongue 48 generally defines a concave receptacle that fits over the hitch ball 22. In certain instances, the tongue 48 of the trailer 8 is coupled to a body 50 of the trailer 8 via one or more drawbars 52. In this example, a center of gravity of the vehicle 10 is a point defined along axes X1, Y1, Z1, and a longitudinal axis extends from the center of gravity of the vehicle 10 to a hitch point (i.e. the hitch ball 22 and the tongue 48) that couples the trailer 8 to the vehicle 10. The trailer 8 has a center of gravity that is a point defined along axes X2, Y2, Z2, with a second longitudinal axis extending to the hitch point. The axes X1, Y1, Z1 are referred to herein as the vehicle coordinate system.

The propulsion system 26 may, in various embodiments, include an internal combustion engine, an electric machine such as a traction motor, and/or a fuel cell propulsion system. The transmission system 28 is configured to transmit power from the propulsion system 26 to the vehicle wheels 16-18 according to selectable speed ratios. According to various embodiments, the transmission system 28 may include a step-ratio automatic transmission, a continuously-variable transmission, or other appropriate transmission. The brake system 32 is configured to provide braking torque to the vehicle wheels 16-18. The brake system 32 may, in various embodiments, include friction brakes, brake by wire, a regenerative braking system such as an electric machine, and/or other appropriate braking systems. The steering system 30 influences a position of the vehicle wheels 16-18. While depicted as including a steering wheel for illustrative purposes, in some embodiments contemplated within the scope of the present disclosure, the steering system 30 may not include a steering wheel.

The driver communication system 24 displays data for the driver and occupants of the vehicle 10, and also receives input from the driver and occupants of the vehicle 10. In one example, the driver communication system 24 comprises an infotainment system, and includes a display 54 and an input device 56. The display 54 is implemented as a flat panel display in an instrument panel or console of the vehicle 10. In this example, the display 54 is an electronic display capable of graphically displaying one or more user interfaces under the control of the controller 40. Those skilled in the art realize other techniques to implement the display 54 in the vehicle 10. The display 54 comprises any suitable technology for displaying information, including, but not limited to, a liquid crystal display (LCD), organic light emitting diode (OLED), plasma, or a cathode ray tube (CRT).

The input device 56 receives inputs from the driver and/or occupant of the vehicle 10. The input device 56 may be implemented as a keyboard (not separately shown), a microphone associated with a speech recognition system (not separately shown), a touchscreen layer associated with the display 54, switches or levers, one or more buttons, a driver monitoring system (DMS) or other suitable device to receive data and/or commands from the user. Of course, multiple input devices can also be utilized. For example, at least one input device may be coupled to the hand wheel. The display 54 and the input device 56 are in communication with the controller 40 over a suitable communication architecture or arrangement that facilitates transfer of data, commands, power, etc.

The sensor system 34 includes one or more sensing devices 58a-58n that each sense observable conditions of the exterior environment and/or the interior environment of the vehicle 10. The sensing devices 58a-58n include, but are not limited to, radars, lidars, optical cameras, thermal cameras, ultrasonic sensors, and/or other sensors. In addition, one or more of the sensing devices 58a-58n may comprise at least a vehicle speed sensor. The one or more sensing devices 58a-58n are in communication with the controller 40 over a suitable communication architecture or arrangement that facilitates transfer of data, commands, power, etc. The vehicle speed sensor measures and observes a speed of the towing vehicle 10, and in one example, the vehicle speed sensor measures and observes a speed of an axle of the towing vehicle 10, and generates sensor signals based thereon. It should be noted that while the vehicle speed sensor is described herein as being associated with measuring and observing the speed of the axle, alternatively, the speed of the towing vehicle 10 can be inferred from a speed of the engine or determined by modeling, a computer vision method such as visual odometry, etc. The one or more sensing devices 58a-58n also include one or more steering angle sensors, which observe an angle of steering system component, such as an angle of the steering knuckles, the hand wheel angle, etc. that indicates whether the vehicle 10 is turning. Generally, the one or more steering angle sensors observe a movement of the steering system 30, which is processed by the controller 40 to determine a turning angle of the vehicle 10. The sensing devices 58a-58n may also include a range sensor, which observes a current range of the transmission system 28 and generates sensor signals based thereon, which are communicated to the controller 40.

The actuator system 36 includes one or more actuator devices 60a-60n that control one or more vehicle features such as, but not limited to, the propulsion system 26, the transmission system 28, the steering system 30, and the brake system 32. In various embodiments, the vehicle features may further include interior and/or exterior vehicle features such as, but are not limited to, doors, a trunk, and cabin features such as air, music, lighting, etc. (not numbered).

The communication system 42 is configured to wirelessly communicate information to and from other entities 62, such as but not limited to, other vehicles ("V2V" communication,) infrastructure ("V2I" communication), remote systems, one or more of the cameras 44 couple to the trailer 8 and/or personal devices, such as one or more smart phones, tablets, etc. In an exemplary embodiment, the communication system 42 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The controller 40 includes at least one processor 64 and a computer readable storage device or media 66. The processor 64 can be any custom made or commercially available processor, a central processing unit (CPU), a graphics processing unit (GPU), an auxiliary processor among several processors associated with the controller 40, a semiconductor based microprocessor (in the form of a microchip or chip set), a macroprocessor, any combination thereof, or generally any device for executing instructions. The computer readable storage device or media 66 may include volatile and nonvolatile storage in read-only memory (ROM), random-access memory (RAM), and keep-alive memory (KAM), for example. KAM is a persistent or non-volatile memory that may be used to store various operating variables while the processor 64 is powered down. The computer-readable storage device or media 66 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 40 in controlling the vehicle 10.

The instructions may include one or more separate programs, each of which comprises an ordered listing of executable instructions for implementing logical functions. The instructions, when executed by the processor 64, receive and process signals from the sensor system 34, perform logic, calculations, methods and/or algorithms for automatically controlling the components of the vehicle 10, and generate control signals to the actuator system 36 to automatically control the components of the vehicle 10 based on the logic, calculations, methods, and/or algorithms. Although only one controller 40 is shown in FIG. 1, embodiments of the vehicle 10 can include any number of controllers 40 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 40 are embodied in the trailer imaging system 100 and, when executed by the processor 64, cause the processor 64 to receive and process signals from the one or more cameras 44, and generate a transparent trailer or full view of an environment behind a towing vehicle when a trailer is attached to the towing vehicle for rendering on the display 54. In various embodiments, the one or more instructions of the controller 40, when executed by the processor 64, cause the processor 64 to receive and process signals from the one or more cameras 44, and generate a bird-eye or 360 degree view of an environment surrounding the towing vehicle and/or the trailer for rendering on the display 54. In various embodiments, the one or more instructions of the controller 40, when executed by the processor 64, cause the processor 64 to receive and process signals from the one or more cameras 44, and determine one or more dynamics associated with the trailer, such as a pivot angle and/or roll angle of the trailer 8 and output one or more alerts based on this determination. The one or more instructions, when executed by the processor 64, also cause the processor 64 to receive and process signals from the one or more cameras 44, and determine a pitch angle. The one or more instructions of the controller 40, when executed by the processor 64, cause the processor 64 to receive and process signals from the one or more cameras 44, and generate one or more alerts for rendering on the display 54 based on the determination. The one or more instructions of the controller 40, when executed by the processor 64, also cause the processor 64 to receive and process signals from the one or more cameras 44, and optionally, output one or more control signals to the one or more actuator devices 60a-60n of the actuator system 36.

According to various embodiments, each of the towing vehicle 10 and the trailer 8 includes one or more cameras 44. The cameras 44 cooperate to define a surround view camera system for the vehicle 10 and trailer 8. In one example, the towing vehicle 10 includes about four to about six cameras 44, and the trailer 8 includes at least one imaging device or camera 44. In this example, the vehicle 10 includes one of the cameras 44 coupled to a front fascia of the vehicle 10, two of the cameras 44 coupled to each side view mirror associated with the vehicle 10 and one of the cameras 44 coupled to the rear 46 of the vehicle 10. In this example, one of the cameras 44 is coupled to a tailgate of the vehicle 10; however, the camera 44 may be coupled at any desired location along the rear 46 so as to face in a direction of the trailer 8. Optionally, one of the cameras 44 is coupled to a windshield of the vehicle 10 at a front 45 of the vehicle 10, so as to face in a forward direction, or in a direction opposite the rear 46 of the vehicle 10. One of the cameras 44 may also be coupled to a front grille at the front 45 of the vehicle 10, so as to face in a forward direction, or in a direction opposite the rear 46 of the vehicle 10. Each of the cameras 44 on the vehicle 10 are in communication with the controller 40 wirelessly, via the communication system 42, or through a wired connection to a communication architecture that facilitates the transfer of data, power, commands, etc.

In one example, each of the cameras 44 coupled to the vehicle 10 is fixedly coupled to the vehicle 10 in a location that is known in the vehicle coordinate system associated with the vehicle 10. Stated another way, the location of the cameras 44 are fixed to the vehicle 10 such that their location (position and pose) is known or pre-calibrated, and thus, the orientation of the field of view of the camera, is known to the controller 40. Stated another way, the location (position and pose) and orientation of the cameras 44 on the vehicle 10 are known to the controller 40 or pre-calibrated in the factory. Generally, each of the cameras 44 on the vehicle 10 have a field of view, and the coordinate location (X1, Y1, Z1) of the camera 44 on the vehicle 10 and the field of view of the respective camera 44 in the vehicle coordinate system are known to the controller 40.

With regard to the trailer 8, in the example of a smaller trailer 8, such as a 4-5 feet (ft.) trailer, the trailer 8 generally includes a single one of the cameras 44. In the example of a larger or longer trailer 8 (i.e. greater than 5 feet (ft.)), the trailer 8 generally includes one of the cameras 44 coupled to either side of the trailer 8, near a front 68 of the trailer 8. The trailer 8 may also include one of the cameras 44 coupled to a rear 70 of the trailer 8, with the rear 70 of the trailer 8 substantially opposite the front 68 of the trailer 8. Optionally, the trailer 8 includes one of the cameras 44 mounted within the trailer 8 in the example of an enclosed trailer 8. Each of the cameras 44 associated with the trailer 8 is coupled to the trailer 8 using any suitable technique. In one example, the cameras 44 are coupled to the trailer 8 via one or more mechanical fasteners, magnets, removable adhesives, hook and loop closures, ratchet straps, and so on. The cameras 44 associated with the trailer 8 are generally removable, such that the cameras 44 may be used with multiple trailers. It should be noted, however that the cameras 44 may be fixedly coupled to the trailer 8, if desired. Each of the cameras 44 on the trailer 8 are in communication with the controller 40 wirelessly, or through a wired connection to a communication architecture that facilitates the transfer of data, power, commands, etc., such as NTSC, LVDS, or Ethernet cables.

The cameras 44 each comprise any camera capable of capturing image data or an image data stream, as known to those skilled in the art. In certain embodiments, one or more of the cameras 44 may comprise a color camera capable of capturing color images. In other embodiments, one or more of the cameras 44 may comprise an infrared camera to capture infrared images. In certain embodiments, one or more of the cameras 44 may include a grayscale camera to capture grayscale images. In certain embodiments, one or more of the cameras 44 may comprise a stereo camera assembly capable of capturing stereo images with depth information. For example, one or more of the cameras 44 may include a stereo camera with two or more lenses and image sensors arranged to capture stereoscopic images about the vehicle 10 and/or trailer 8 with depth information. One or more of the cameras 44 may be long-range cameras for capturing images over an extended distance and may be coupled to the front 45 and/or the back 46 of the vehicle 10 and/or the trailer 8. Images may be captured by the cameras 44 according to various timings or other considerations. In certain embodiments, for example, the respective cameras 44 may capture images continuously as the vehicle 10 moves (based on the sensor signals from the one or more sensing devices 58a-58n) or based on a gear range of the transmission. In certain embodiments, the controller 40 may cause the respective cameras 44 to capture images of the areas near the rear 46 of the vehicle 10 and the rear 70 of the trailer 8, respectively, at regular time intervals as the vehicle 10 moves. For example, when the vehicle 10 is stopped or moving very slowly, and the controller 40 may process the images captured by the cameras 44 and determine whether the environment surrounding the vehicle 10 has no moving objects. If there are no moving objects detected, and the vehicle 10 is stopped or moving slowly, the controller may decrease the frame rate or sampling rate of the cameras 44. In other instances, when the vehicle 10 is travelling at a high rate of speed or a moving object is detected by the controller 40 in the images from one or more of the cameras 44, the controller 44 may increase the frame rate or sampling rate in order to determine changes at a higher rate of speed of the vehicle 10.

As will be discussed further below, the processor 64 receives and processes image data or an image stream from the one or more cameras 44 and assembles the image data from the one or more cameras 44 to generate a "transparent trailer" view of the rear 46 of the vehicle 10 for display on the display 54 associated with the driver communication system 24, which is unobstructed by the trailer 8 or in which the trailer 8 is transparent in the view. As used herein the phrase "unobstructed by the trailer," denotes a view of the rear 46 of the towing vehicle 10 as seen devoid of the trailer 8 or without the trailer 8 within the view. As used herein, "view" denotes an image or image data stream, which is generated by the controller 40 and displayed on the display 54 of the driver communication system 24. It should be noted that while described and illustrated herein as being removed from the view, the trailer 8 may also have varying levels of transparency in the view, if desired. In certain instances, one or more of the images from the one or more cameras 44 are blended in a blend zone to transition to a boundary, which is a boundary between two images, and the blend zone may be defined by the speed of the vehicle 10, as observed by the one or more sensing devices 58a-58n.

In addition, the controller 40 receives and processes the image data to generate a "bird-eye" view of the vehicle 10, which includes a surround view of the vehicle 10 and/or the trailer 8, for display on the display 54 associated with the driver communication system 24. The controller 40 also receives and processes the image data of the image stream to detect one or more objects in the image data, and generates one or more warnings or alerts for rendering on the display 54 associated with the driver communication system 24. The controller 40 also receives and processes the image data to generate a view for rendering on the display 54 that assists in coupling the trailer 8 to the vehicle 10.

As will be discussed, the processor 64 further receives and processes the image data to determine one or more conditions of the trailer 8. For example, in various embodiments, the controller 40 receives and processes the image data of the image streams to determine the following conditions associated with the trailer 8: whether the trailer 8 is within a lane (lane keeping for the trailer 8); whether the trailer 8 needs assistance in turning about a corner; whether the trailer 8 is swaying; whether the trailer 8 is rolling; whether the trailer 8 is balanced; whether the trailer is over a towing capacity of the vehicle 10; and/or whether an articulation or pivot angle of the trailer 8 relative to the vehicle 10 is above a predefined threshold. In one example, the occupant may also view whether the trailer 8 is within the lane based on one or user interfaces generated by the controller 40. Thus, the controller 40 determines a lane of travel for the trailer 8; a turning radius of the trailer 8 relative to a curve; a movement of the trailer 8 in a side-to-side direction (laterally) relative to the vehicle 10; a movement of the trailer 8 relative to a vertical axis; a pitch angle of the trailer 8; and/or a pivot angle of the trailer 8. In one example, the controller 40 determines the turning radius using a vehicle model, such as a bicycle model, based on a steering angle (received from the steering system 30), and a vehicle and trailer drivetrain type (front wheel drive (FWD), all-wheel drive (AWD), four wheel drive (4WD), wheelbase, trailer drive axle distance to hitch pivot point, etc.). In one example, the controller 40 determines the line of travel using the vehicle model and based on a turning radius of the vehicle 10, a speed of the vehicle 10 and an acceleration of the vehicle 10. Each of these determinations by the controller 40 is output for rendering on the display 54 associated with the driver communication system 24 to inform the driver of the vehicle 10 of a condition of the trailer 8. In one example, one or more of the determined conditions are graphically illustrated and overlaid on a view generated by the controller 40, such as the "bird-eye" view and/or the "transparent trailer" view.

Figure 3:
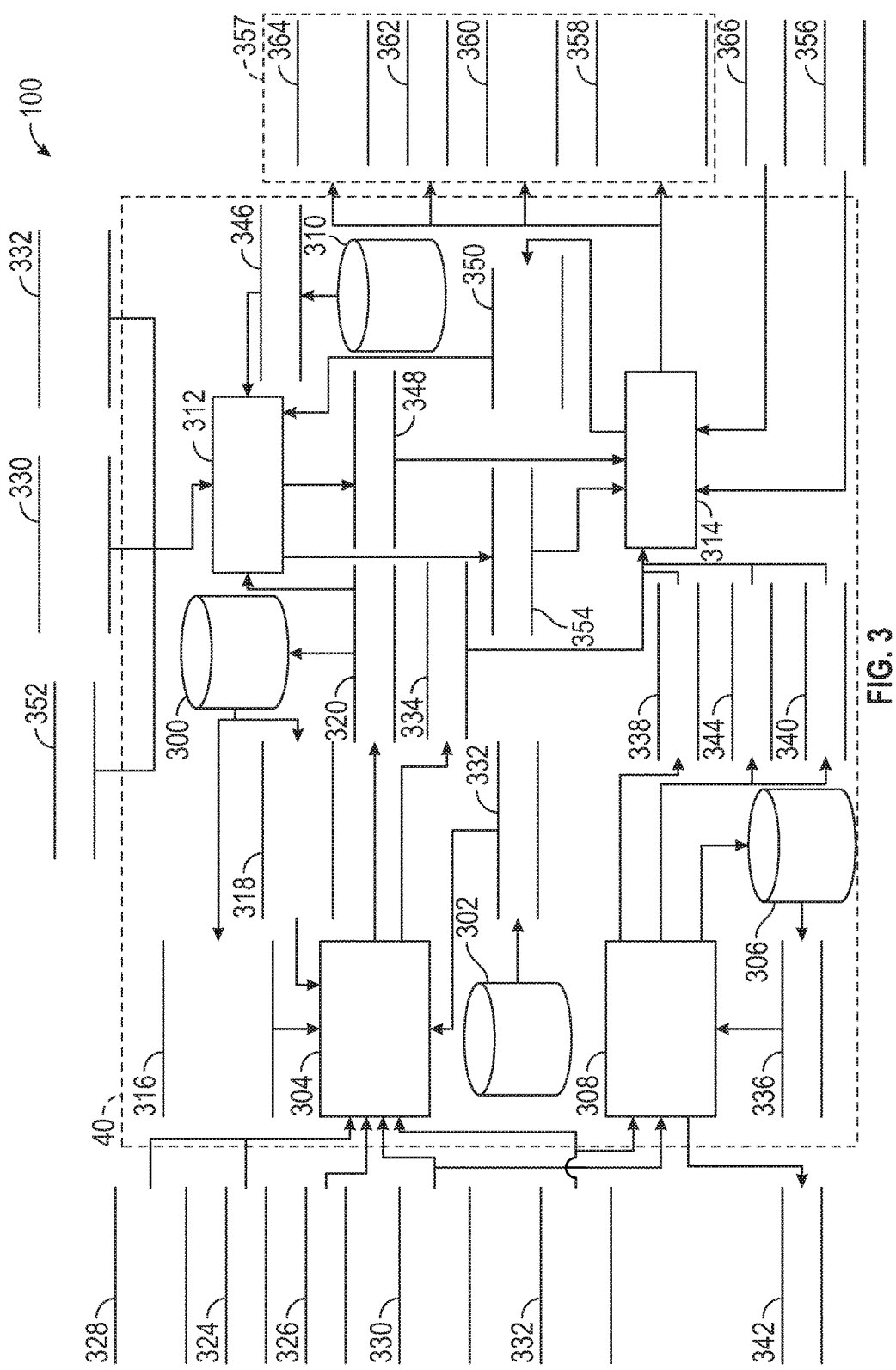
FIG. 3 is a dataflow diagram illustrating the trailer imaging system of the vehicle of FIG. 1, in accordance with various embodiments.

For example, as shown in more detail with regard to FIG. 3 and with continued reference to FIGS. 1-2, a dataflow diagram illustrates various embodiments of the trailer imaging system 100, which may be embedded within the controller 40. Various embodiments of the trailer imaging system 100 according to the present disclosure can include any number of sub-modules embedded within the controller 40. As can be appreciated, the sub-modules shown in FIG. 3 can be combined and/or further partitioned to similarly generate the "bird-eye" view, the "transparent trailer" view and to determine the one or more conditions associated with the trailer 8. Inputs to the trailer imaging system 100 may be received from the sensor system 34 (FIG. 1), received from the driver communication system 24, received from other control modules (not shown) associated with the vehicle 10, received from the one or more cameras 44 (FIGS. 1 and 2), and/or determined/modeled by other sub-modules (not shown) within the controller 40. In various embodiments, the trailer imaging system 100 includes a calibration datastore 300, a tables datastore 302, a calibration manager module 304, a threshold datastore 306, a conditions determination module 308, a coefficient datastore 310, a view rendering module 312 and a user interface (UI) control module 314.

The calibration datastore 300 stores vehicle camera locations 316 of known positions and poses for each of the cameras 44 coupled to the vehicle 10 in a vehicle coordinate system, including known field of views of the cameras 44 coupled to the vehicle 10. Thus, the vehicle camera locations 316 include known coordinate location information in the vehicle coordinate system for the cameras 44 coupled to the vehicle 10, such as the coordinate location for the camera(s) 44 coupled to the front 45 of the vehicle 10, the coordinate location for the camera 44 coupled to the rear 46 of the vehicle 10, the coordinate location for each of the cameras 44 coupled to the side view mirrors, etc. In one example, the coordinate location may be defined as an (X1, Y1, Z1) value in the X1, Y1, Z1 vehicle coordinate system. Generally, the vehicle coordinate location for each of the cameras 44 is predefined or pre-calibrated, by the factory, for example.

The calibration datastore 300 also stores calibration image data 318 and calibration data 320, which are each populated by the calibration manager module 304. The calibration image data 318 comprises an initial image captured by the one or more cameras 44, based on the trailer 8 not yet being coupled to the vehicle 10. Thus, the calibration image data 318 is a reference image that is captured prior to the trailer 8 being coupled to the vehicle 10. The calibration data 320 includes a position or coordinate location in the vehicle coordinate system for each of the cameras 44 coupled to the trailer 8 and a position or a coordinate location in the vehicle coordinate system for a field of view associated with each of the cameras 44, as determined by the calibration manager module 304.

The tables datastore 302 stores a correlation table that correlates a horizontal position change of one or more pixels in an image with a pitch angle of the vehicle 10. Thus, the table datastore 302 stores one or more lookup tables, which provide a pitch angle 322 that corresponds with the horizontal position change of the one or more pixels within an image as determined by the calibration manager module 304. The pitch angle 322 is an angular value for the amount the vehicle 10 is rotated about the Y1-axis, due to the weight of the trailer 8 on the hitch ball 22, for example. The pitch angles 322 stored in the table datastore 302 are each predefined, and factory set.

The calibration manager module 304 calibrates the cameras 44 on the trailer 8 to the vehicle 10. In this regard, the cameras 44 associated with the vehicle 10 are pre-calibrated relative to the vehicle coordinate system of the vehicle 10 such that the position and pose of the respective camera 44 and the field of view of that camera 44 is known to the calibration manager module 304. Generally, however, the position and field of view of the cameras 44 associated with the trailer 8 are not known to the calibration manager module 304. In various embodiments, the calibration manager module 304 receives as input coupler data 324. The coupler data 324 may be received from other modules associated with the vehicle 10. Generally, the coupler data 324 indicates whether the trailer 8 is coupled to the vehicle 10. In various embodiments, the coupler data 324 is a signal generated by the coupling or connection of a wiring harness of the trailer 8 to a wiring harness of the vehicle 10.

Based on the coupler data 324 indicating that the trailer 8 is coupled to the vehicle 10, the calibration manager module 304 determines a number of the cameras 44 coupled to the trailer 8. In one example, the calibration manager module 304 determines the number of cameras 44 coupled to the trailer 8 based on input received through the wiring harness, in the example of the cameras 44 being wired to the wiring harness of the trailer 8. In various embodiments, the calibration manager module 304 determines the number of cameras 44 coupled to the trailer 8 based on a number of wireless channels having image data streams that are received by the controller 40 via the communication system 42.

With the number of cameras 44 coupled to the trailer 8 determined, the calibration manager module 304 receives as input range data 326. The range data 326 indicates a current range of the transmission system 28, such as a park range, a neutral range, a drive range, a low range, etc. The range data 326 may be received from other modules associated with the vehicle 10, such as a transmission control module associated with the transmission system 28. The calibration manager module 304 processes the range data 326 to determine whether the vehicle 10 is in the drive range. If true, the calibration manager module 304 receives as input vehicle path data 328. The vehicle path data 328 indicates whether the vehicle 10 is traveling along a substantially straight path. In one example, the vehicle path data 328 is one or more sensor signals received from the sensor system 34, which indicates an amount of movement of the component of the steering system 30. For example, the vehicle path data 328 may comprise an observed amount of movement of a steering knuckle, a hand wheel angle, etc.

The calibration manager module 304 processes the vehicle path data 328 and determines whether the vehicle 10 is traveling on a substantially straight path. In the example of the observed movement of the hand wheel of the steering system 30 received as the vehicle path data 328, the calibration manager module 304 processes the hand wheel angle and determines whether the hand wheel is at an angle that is substantially zero degrees, which indicates that the vehicle 10 is traveling along a substantially straight path.

Based on the determination that the vehicle 10 is traveling along a substantially straight path, the calibration manager module 304 receives as input trailer camera image data 330 and vehicle camera image data 332. The trailer camera image data 330 is the image streams received from each of the cameras 44 coupled to the trailer 8, and the vehicle camera image data 332 is the image stream received from each of the cameras 44 coupled to the vehicle 10. The calibration manager module 304 samples the image streams in the trailer camera image data 330 and the image streams in the vehicle camera image data 332 and acquires images from each of the image streams. The calibration manager module 304 compares the images acquired from the vehicle camera image data 332 to the images acquired from the trailer camera image data 330 to determine areas of overlap between the vehicle camera image data 332 and the trailer camera image data 330. In one example, the calibration manager module 304 compares the images acquired from the vehicle camera image data 332 for both sides of the vehicle 10 and the trailer 8 to the images acquired from the trailer camera image data 330 for both sides of the vehicle 10 and the trailer 8 substantially simultaneously or in parallel to determine areas of overlap between the vehicle camera image data 332 and the trailer camera image data 330 surrounding both the vehicle 10 and the trailer 8.

The calibration manager module 304 processes the images identified to overlap based on feature point or pattern detection to determine features, such as corner points, object textures or patterns, colors, etc. in each of the acquired images. The calibration manager module 304 determines which features are common features between the trailer camera image data 330 and the vehicle camera image data 332 via matching and tracking. For each common feature, the calibration manager module 304 estimates a homography matrix between the respective camera 44 on the vehicle 10 associated with the vehicle camera image data 332 and the respective camera 44 on the trailer 8 associated with the trailer camera image data 330.

Based on the estimated homography matrix, the calibration manager module 304 determines a distance from the respective camera 44 on the vehicle 10 to the respective common feature and a distance from the respective camera 44 on the trailer 8 to the respective common feature. The calibration manager module 304 repeats this process for each camera 44 on the trailer 8 until the number of distances determined is greater than a threshold. In one example, the threshold is three distances for each camera 44 on the trailer 8. With three distances determined for each camera 44 on the trailer 8, for each camera 44 on the trailer 8, the calibration manager module 304 uses triangulation to estimate a three-dimensional coordinate location and pose of the respective camera 44 on the trailer 8 in the vehicle coordinate system. Generally, the calibration manager module 304 uses triangulation to estimate six extrinsic parameters for each camera 44, such as location (x, y, z) and pose (pitch, roll, yaw). At least three matching feature point pairs from the triangulation generates six equations between the image pixel (u,v) pairs of the matching feature points in the known camera 44 on the vehicle 10 and the camera 44 on trailer 8. The calibration manager module 304 solves these six equations to determine the unknown extrinsic parameters of location (x, y, z) and pose (pitch, roll, yaw) of the camera 44 on trailer 8. In one example, when there are more than three matching feature point pairs, the calibration manager module 304 may employ a statistical method (e.g. RANSAC) to provide a more robust estimation. The calibration manager module 304 stores the determined coordinate locations for each of the cameras 44 on the trailer 8 as the calibration data 320 in the calibration datastore 300. The calibration manager module 304 also sets the calibration data 320 for the view rendering module 312.

Figure 4:
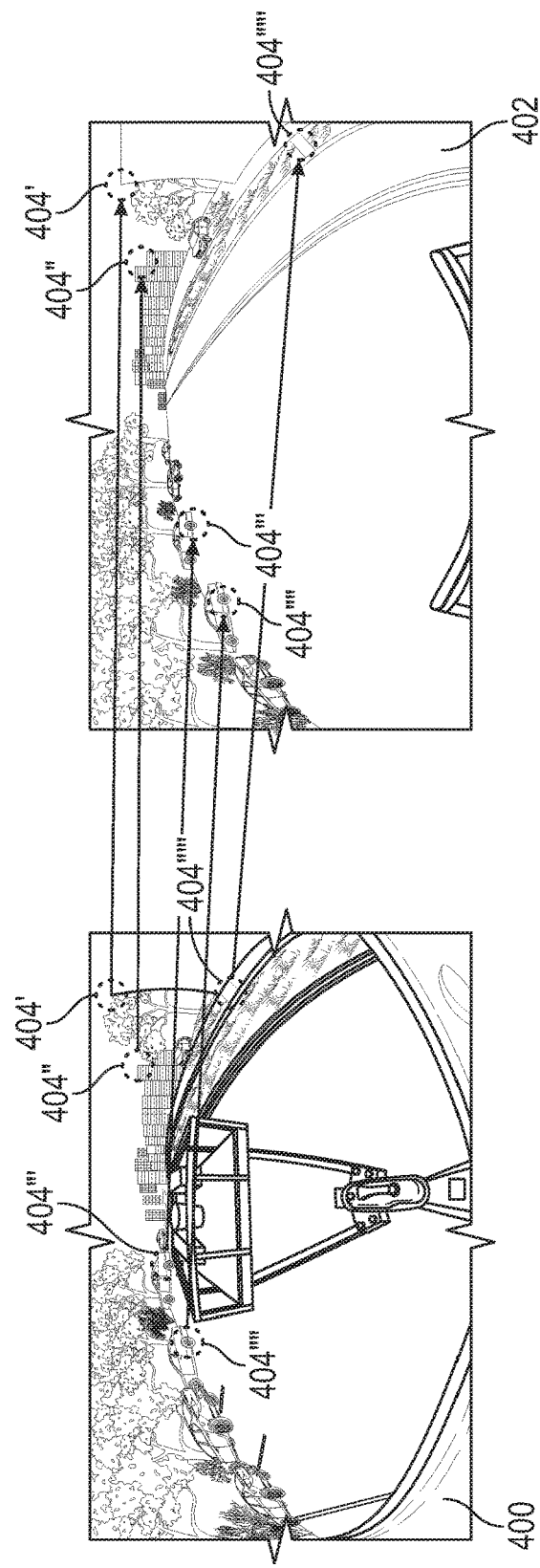
FIG. 4 illustrates an exemplary feature point detection and matching method performed by the trailer imaging system to calibrate a location of cameras coupled to the trailer of FIG. 1, in accordance with various embodiments.

For example, with reference to FIG. 4, an exemplary image 400 acquired from one of the cameras 44 on the vehicle 10 is shown, and an exemplary image 402 acquired from one of the cameras 44 on the trailer 8 is shown. In this example, the camera 44 on the vehicle 10 is mounted on the rear 46 of the vehicle 10, and the camera 44 on the trailer 8 is mounted on the rear 70 of the trailer 8. The calibration manager module 304 has determined that areas in these two images 400, 402 overlap, and has processed these images 400, 402 to identify common features 404i-404v between the two images 400, 402. As discussed, for each of these common features 404i-404v, the calibration manager module 304 estimates the homography matrix to determine the distance between each of the cameras 44 to the common feature 404i-404v. As the coordinate location of the camera 44 on the vehicle 10 is known, based on the determined distances from the homography matrix, the calibration manager module 304 uses triangulation to determine the coordinate location of the camera 44 on the trailer 8 in the vehicle coordinate system.

With reference to FIG. 3, in one example, based on the coupler data 324 indicating that the trailer 8 is not coupled to the vehicle 10, the calibration manager module 304 receives as input the vehicle camera image data 332. In this example, the calibration manager module 304 samples the image streams from at least one of the cameras 44 on the front 45 of the vehicle 10 to acquire an image. The calibration manager module 304 stores this acquired image as the calibration image data 318 in the calibration datastore 300. In various embodiments, the calibration manager module 304 may acquire the image for the calibration image data 318 based on input received from the input device 56. In various embodiments, the calibration manager module 304 may sample the image streams from the at least one of the cameras 44 on the front 45 of the vehicle 10 to acquire the calibration image data 318 based on the range data 326, which indicates that the vehicle 10 is in a reverse range. In various embodiments, the calibration manager module 304 may sample the image data stream from the camera 44 on the rear 46 of the vehicle 10 to determine whether the vehicle 10 is approaching the trailer 8, and may then sample the image streams from the at least one of the cameras 44 on the front 45 of the vehicle 10 to acquire the calibration image data 318 based on this determination.

With reference to FIG. 3, in an instance where the calibration manager module 304 has generated the calibration data 320 and receives a subsequent signal from the coupler data 324 that indicates that the trailer 8 is coupled or re-coupled to the vehicle 10, the calibration manager module 304 queries the calibration datastore 300 and retrieves the calibration image data 318. The calibration manager module 304 also receives as input the vehicle camera image data 332, and samples the image streams from the vehicle camera image data 332 to acquire an image. It should be noted that the calibration manager module 304 may also sample the image streams from the vehicle camera image data 332 to acquire an image for calibration based on input received from the input device 56. In various embodiments, the calibration manager module 304 may sample the image streams from the vehicle camera image data 332 to acquire an image for calibration based on signals received from the sensor system 34 of the vehicle 10, such as a door ajar sensor that indicates an occupant has left the vehicle 10 to couple the trailer 8 to the vehicle 10.

Generally, the calibration manager module 304 samples at least one of the cameras 44 on the front 45 of the vehicle 10. The calibration manager module 304 compares the image data from the calibration image data 318 to the image acquired from the vehicle camera image data 332 to determine whether one or more pixels have shifted relative to the horizon between the two images. Stated another way, the calibration manager module 304 processes the calibration image data 318 and the image data to determine a position of one or more pixels relative to a horizon. It should be noted that the calibration manager module 304 may also process the calibration image data 318 and the image data acquired from the vehicle camera image data 332 to determine a shift between image patterns or a shift between one or more feature points.

Based on the position, the calibration manager module 304 determines whether the one or more pixels have shifted relative to the horizon between the calibration image data 318 and the image data. Based on a determined horizon position change, the calibration manager module 304 queries the tables datastore 302 and retrieves the pitch angle 322 associated with the horizon position change.

The calibration manager module 304 compares the retrieved pitch angle 322 with a pitch angle threshold. The pitch angle threshold is a default or factory set maximum pitch angle for the vehicle 10 towing the trailer 8. In one example, the pitch angle threshold is determined based on a maximum raise of a front wheel well of the vehicle 10 after the trailer 8 is coupled to the vehicle 10, with the maximum raise of the front wheel well of about 1.0 inches (in.). Based on the comparison, the calibration manager module 304 determines whether the retrieved pitch angle 322 exceeds the pitch angle threshold. If true, the calibration manager module 304 sets pitch alert 334 for the UI control module 314. The pitch alert 334 indicates that the pitch angle of the vehicle 10 exceeds the maximum pitch angle. Generally, the pitch angle of the vehicle 10 exceeds the maximum pitch angle due to overloading of the trailer 8, the trailer 8 being unbalanced and/or the trailer 8 exceeding a towing capacity for the vehicle 10. Thus, based on the comparison of the pitch angle 322 to the pitch angle threshold, the calibration manager module 304 determines whether the trailer 8 is overloaded, unbalanced or exceeds the towing capacity.

If the pitch angle 322 does not exceed the pitch angle threshold, the calibration manager module 304 updates the calibration data 320 stored in the calibration datastore 300 based on the pitch angle 322. In one example, the calibration manager module 304 updates the known position of the cameras 44 coupled to the vehicle 10 based on the pitch angle 322. In this regard, as the vehicle 10 is pitching due to the weight of the trailer 8, as each of the cameras 44 are fixedly coupled to the vehicle 10, each of the cameras 44 have moved about the Y-axis by the pivot angle 338.

In various embodiments, the calibration manager module 304 may determine the pitch angle of the vehicle 10 based on the teachings of U.S. Pub. No. 2015/0332098 or U.S. Pub. No. 2015/0332446 (U.S. Ser. No. 14/710,322; the relevant content of each of these applications is incorporated herein by reference. Each of these applications provide techniques for estimating vehicle dynamics (including roll and center of gravity) based on surround-view camera imagery analysis, which may be adapted to determine a pitch, roll and center of gravity of the trailer 8.

In other embodiments, the calibration manager module 304 may determine the pitch angle 322 of the vehicle 10 by processing the calibration image data 318 and the image acquired from the vehicle camera image data 332 based on feature point or pattern detection to determine features, such as corner points, object textures or patterns, colors, etc. in each of the images. The calibration manager module 304 matches the common features and estimates a homography matrix between the common features to determine the pitch angle 322. Generally, the calibration manager module 304 processes the image acquired from the at least one camera 44 coupled to the front 45 of the vehicle 10 to determine the pitch angle 322. In various embodiments, the calibration manager module 304 may also process images acquired from multiple cameras 44 (e.g. from the cameras 44 at the front 45 and the rear 46, or from all surround view cameras 44 coupled to the trailer 8 and the forward looking and backward looking long-range cameras 44 coupled to the vehicle 10) to determine the pitch angle 322 of the vehicle 10.

The threshold datastore 306 stores one or more thresholds associated with one or more conditions of the trailer 8. Thus, the threshold datastore 306 stores one or more lookup tables, which provide thresholds 336 for a particular condition of the trailer 8. For example, the threshold datastore 306 stores at least a threshold 336 for a pivot or yaw angle of the trailer 8 and at least a threshold 336 for a roll angle of the trailer 8. In various embodiments, the threshold datastore 306 may also store the pitch angle threshold, which may be retrieved by the calibration manager module 304. Each of the thresholds 336 (the pivot angle threshold, the roll angle threshold and optionally, the pitch angle threshold) stored in the threshold datastore 306 are predefined, and factory set values. Generally, the pivot angle threshold is pre-defined or factory set based on characteristics of the vehicle 10, such as a maximum brake force applied by the brake system 32, to prevent a jack-knifing of the trailer 8; and the roll angle threshold is pre-defined or factory set based on characteristics of the vehicle 10, such as a center of gravity, to prevent a rollover of the vehicle 10 and/or the trailer 8.

The conditions determination module 308 determines dynamics between the vehicle 10 and the trailer 8 based on the image data from the cameras 44. In one example, the dynamics include the articulation or pivot angle of the trailer 8 relative to the vehicle 10 and the roll angle of the trailer 8 relative to the vehicle 10. The determined dynamics also include the pitch angle between the vehicle 10 and trailer 8, as determined by the calibration manager module 304. The conditions determination module 308 receives as input the vehicle camera image data 332 from the cameras 44 of the vehicle 10. In various embodiments, the conditions determination module 308 uses foreground/background segmentation to determine a location of the trailer 8 in the image stream from the cameras 44 on the vehicle 10. In this example, the trailer 8 is in the background, and the scene around the vehicle 10 as the vehicle 10 is moving is the foreground. The segmentation is performed at a sample rate of about 15 seconds to about 1 minute.

Once the trailer region is detected (as the trailer 8 remains fixed in the image data), the conditions determination module 308 determines feature points or patterns, such as lines or corners on the drawbar 52 or the front 68 of the trailer 8 (e.g. a front panel of the trailer 8), colors, etc., and matches the feature points or patterns to estimate a homography matrix (e.g. using RANSC method) to determine a distance from each of the cameras 44 to the feature points or patterns. Based on the distances and the known vehicle coordinate location of each of the cameras 44, the conditions determination module 308 calculates a pivot angle 338 of the trailer 8. The pivot angle 338 is the angle of articulation of the trailer 8 relative to the vehicle coordinate system of the vehicle 10. It should be noted that the conditions determination module 308 may also use foreground/background segmentation to detect whether the trailer 8 is coupled to the vehicle 10. The conditions determination module 308 sets the pivot angle 338 for the UI control module 314. It should be noted that the use of foreground/background segmentation is just one example method for determining the pivot angle. Other computer vision techniques may be employed to determine the pivot angle. For example, deep learning based synthetic image generation, such as the Generative Adversarial Nets (GAN) image generation or the DLNN based image synthesis/enhancement technology, may be used.

Based on the determined pivot angle 338, the conditions determination module 308 queries the threshold datastore 306 and retrieves the threshold 336 for the pivot angle. The conditions determination module 308 compares the pivot angle 338 to the threshold 336 for the pivot angle 338. If the pivot angle 338 is greater than the threshold 336, the conditions determination module 308 sets a pivot alert 340 for the UI control module 314. The pivot alert 340 is a notification that the pivot angle 338 of the trailer 8 is greater than the predefined threshold for the angle of articulation of the trailer 8 relative to the vehicle 10. Optionally, in various embodiments, based on the pivot angle 338 being greater than the threshold 336, the conditions determination module 308 generates one or more control signals 342 for the actuator system 36. For example, the one or more control signals 342 are a command to actuate the brake system 32 to slow a speed of the vehicle 10, etc. In various embodiments, the one or more control signals 342 may also include a command to actuate a brake system associated with the trailer 8, a command to actuate the steering system 38 of the vehicle 10, etc. In various embodiments, the one or more control signals 342 are a command to the brake system 32 of the vehicle 10 and a command to a brake system associated with the trailer 8.

It should be noted that the conditions determination module 308 may determine the pivot angle 338 differently in various embodiments. For example, the conditions determination module 308 may determine the pivot angle 338 by receiving and processing the vehicle camera image data 332 from the one or more cameras 44 on the vehicle 10 to determine a position of the drawbar 52 in the image stream. For example, the conditions determination module 308 receives and processes the image stream from the camera 44 coupled to the rear 46 of the vehicle 10. Based on a known position of the hitch receiver 20 (as the hitch receiver 20 is fixedly coupled to the vehicle 10) and the known position of the camera 44 on the vehicle 10, the conditions determination module 308 samples the image stream from the camera 44 coupled to the rear 46 of the vehicle 10 to acquire an image. The conditions determination module 308 processes the image data to determine whether the drawbar 52 has moved relative to an axis that extends through the known position of the hitch receiver 20. In one example, the axis extends substantially parallel to the X1-axis through the hitch receiver 20. The conditions determination module 308 calculates the pivot angle 338 as the angle between the determined position of the drawbar 52 in the image data, and the axis that extends substantially parallel to the X1-axis through the known position of the hitch receiver 20.

In various embodiments, the conditions determination module 308 determines a roll angle of the trailer 8 relative to the vehicle 10 based on the distances determined from the estimated homography matrix and the known vehicle coordinate location of each of the cameras 44 discussed above with regard to the determination of the pivot angle 338. The roll angle is an amount of rotation of the trailer 8 about the X1-axis. Based on the determined roll angle, the conditions determination module 308 queries the threshold datastore 306 and retrieves the threshold 336 for the roll angle. The conditions determination module 308 compares the roll angle to the threshold 336 for the roll angle. If the roll angle is greater than the threshold 336, the conditions determination module 308 sets a roll alert 344 for the UI control module 314. The roll alert 344 is a notification that the roll angle of the trailer 8 is greater than the predefined threshold for the roll angle. Optionally, in various embodiments, based on the roll angle being greater than the threshold 336, the conditions determination module 308 generates the one or more control signals 342 for the actuator system 36.

In various embodiments, the teachings of U.S. Pub. No. 2015/0332098 or U.S. Pub. No. 2015/0332446 (U.S. Ser. No. 14/710,322; are used to determine the pitch or roll of the vehicle 10 and/or the trailer 8 while the vehicle 10 is moving or driving. Based on detecting and tracking of image patterns or feature points from the images captured from the cameras 44 coupled to the vehicle 10 (the vehicle camera image data 332) or from the cameras 44 on the trailer 8 (the trailer camera image data 330), the relative movement(s) between the cameras 44 may be detected using computer vision technology, including, but not limited to, triangulation, homograph estimation, SLAM, etc. Since the cameras 44 are rigidly mounted on the vehicle 10 or the trailer 8, in other words, the cameras 44 on the vehicle 10 or the cameras 44 on the trailer 8 are treated as a rigid body, the dynamics of the vehicle 10 or the dynamics of the trailer 8 may be estimated from the detected on-board movement of the cameras 44.

The coefficient datastore 310 stores one or more blending coefficients associated with blending a view for rendering on the display 54 based on a speed of the vehicle 10. Thus, the coefficient datastore 310 stores one or more lookup tables, which provide blending coefficients 346 for a blending zone or region around a boundary line in an image stream to arrive at a seamless view based on the speed of the vehicle 10. For example, a high speed of the vehicle 10 (as measured by the one or more sensing devices 58a-58n) requires a smaller blending zone or region to generate a smooth view, while a low speed of the vehicle 10 requires a larger blending region to generate a smooth view. Generally, when the vehicle 10 and the trailer 8 are travelling at a high speed (e.g. on highway), it may be less likely that an object is close to the vehicle 10 and/or trailer 8, so the blending region (of the overlapping field of views) is smaller to get a sharp view without doubling the same object in the view. When the vehicle 10 and the trailer 8 are travelling at low-speed (e.g. parking lot maneuver), it may be more likely to have very close obstacles/objects within the full overlapped field of view. In instances where the vehicle 10 and the trailer 8 are traveling at low-speeds, the blending zone is larger to provide a smoother image and to ensure the objects are captured in the view. In various embodiments, the blending coefficients 346 are predefined, and factory set values.

The view rendering module 312 generates a full view 348 for rendering on the display 54 that is unobstructed by the trailer 8 or devoid of the trailer 8. As will be discussed, as the cameras 44 each define a field of view, based on the calibration data 320, the view rendering module 312 generates the full view 348 for display on the display that is unobstructed by the trailer 8 or devoid of the trailer 8. Stated another way, the view rendering module 312 generates a view that comprises the image data behind the trailer 8 as if the trailer 8 was not coupled to the vehicle 10, for rendering on the display 54 of the driver communication system 24. Generally, as the positions of the cameras 44 on the vehicle 10 are known by the view rendering module 312, and the positions of the cameras 44 on the trailer 8 are determined as discussed previously herein, the view rendering module 312 determines an overlap in the images of the image stream acquired by the respective cameras 44. Based on the determined overlap, the view rendering module 312 defines boundary lines or blending zones, and assembles the images of the image stream from the respective overlapping cameras 44 together to generate a substantially uniform view of the area behind the rear 46 of the vehicle 10, in which the view is not obstructed by the trailer 8.

In various embodiments, the view rendering module 312 receives as input the vehicle camera image data 332 and the trailer camera image data 330. The view rendering module 312 also receives as input trailer dimensions 350. The trailer dimensions 350 are received as input to the UI control module 314, for example, via a user's manipulation of the input device 56. The trailer dimensions 350 include, but are not limited to, the length, width and height of the trailer 8 coupled to the vehicle 10. It should be noted that one or more of these values may also be estimated, based on the images of the image streams from the vehicle camera image data 332 and/or the trailer camera image data 330. Based on the trailer dimensions 350, the view rendering module 312 determines a size of the view that contains the trailer 8. Generally, the trailer dimensions determine in the rendered view, the size and location of the image region which corresponding to the view blocked by the trailer 8 that needs to be filled/blended by images from cameras 44 on the trailer 8.

The view rendering module 312 receives as input the calibration data 320. The view rendering module 312 processes the vehicle camera image data 332 and the trailer camera image data 330 based on the calibration data 320 and the known locations of the cameras 44 on the vehicle 10 to determine the areas of overlap in the images of the image streams. Based on the overlap, the view rendering module 312 defines stitching boundary lines. In one example, the stitching boundary lines are defined along one or more lines created by a perimeter of the overlap.

Figure 5A:
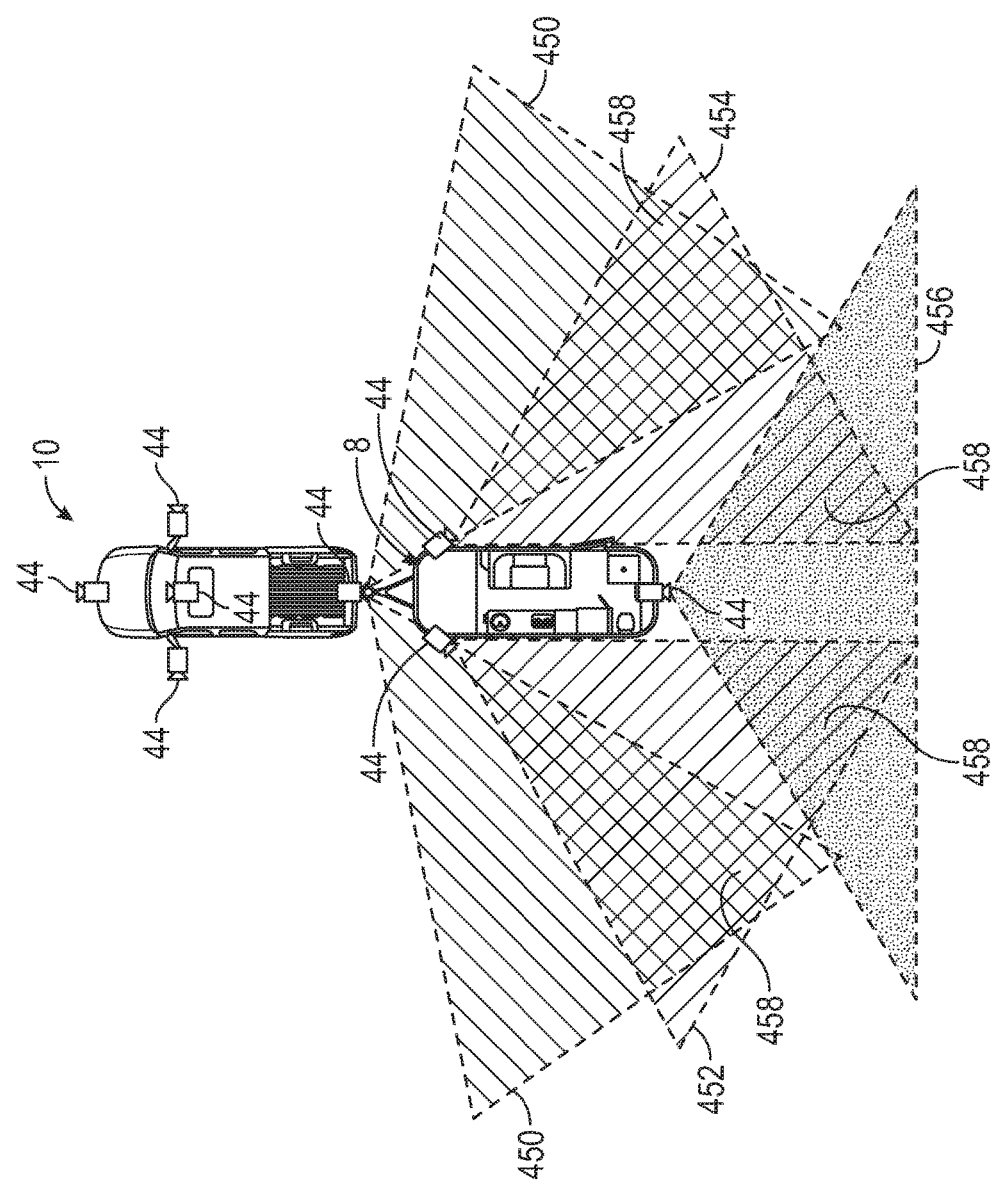
FIG. 5A illustrates exemplary field of views for cameras coupled to the vehicle and the trailer of FIG. 1, which illustrates areas of overlap between the field of views, in accordance with various embodiments.

For example, with reference to FIG. 5A, at least one of the cameras 44 on the vehicle 10 has a field of view 450 that overlaps with a field of view 452 of one of the cameras 44 on the trailer 8. In this example, the field of view 450 of the camera 44 on the vehicle 10 overlaps with the field of view 452 of one of the cameras 44 on the trailer 8, and overlaps with a field of view 454 of another one of the cameras 44 on the trailer 8. The camera 44 on the rear 70 of the trailer 8 has a field of view 456, which overlaps with the field of view 452, 454. The view rendering module 312 determines areas 458 of overlap in the images of these image streams.

Figure 5B:
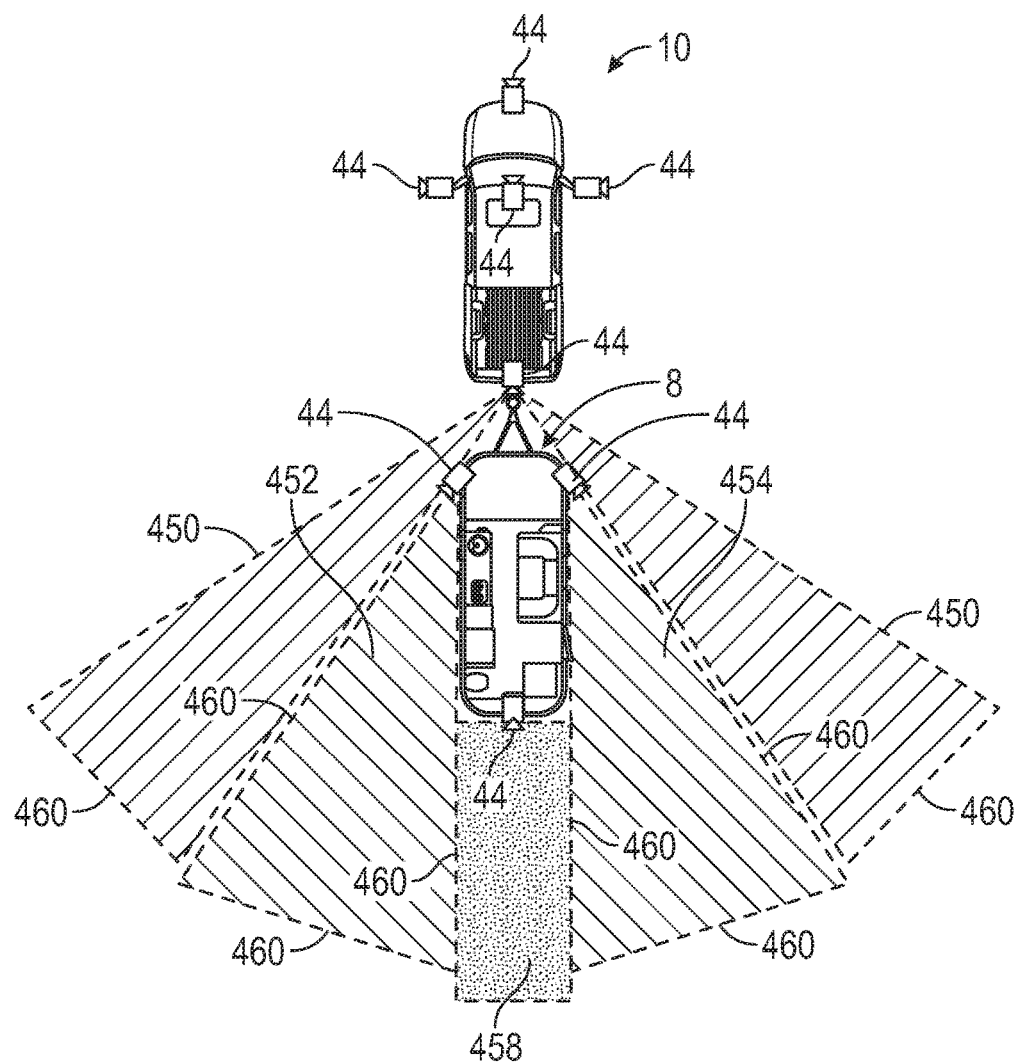
FIG. 5B illustrates an exemplary stitched image generated by the trailer imaging system of the vehicle of FIG. 1, based on the areas of overlap in FIG. 5A, in accordance with various embodiments.

With reference to FIG. 5B, FIG. 5B schematically illustrates the stitching boundary lines defined by the view rendering module 312 based on the areas 458 of overlap determined in FIG. 5A. As shown, one or more stitching boundary lines 460 are defined along a perimeter of the areas 458 of overlap.

With reference back to FIG. 3, the view rendering module 312 receives as input speed data 352. The speed data 352 is the speed of the vehicle 10 as observed by the one or more sensing devices 58a-58n of the sensor system 34, or determined based on modeling, for example. Based on the speed of the vehicle 10, the view rendering module 312 queries the coefficient datastore 310 and retrieves the corresponding blending coefficient 346. The view rendering module 312 stitches the image streams together at the boundary lines and blends the images of the image streams along the boundary line based on the blending coefficient 346 to generate a uniform, seamless image. It should be noted that the view rendering module 312 may also blend the images of the image streams based on the overlapping of the field of views of the cameras 44. The seamless image is the full view 348 of the rear 46 of the vehicle 10, as observed by the cameras 44, in which the trailer 8 is devoid in the view. The view rendering module 312 sets the seamless image as the full view 348 for the UI control module 314.

The view rendering module 312 also receives as input the pivot angle 338. The view rendering module 312 determines whether the pivot angle 338 is greater than zero degrees, which indicates that the trailer 8 is angled relative to the vehicle 10. If true, the view rendering module 312 adjusts the boundary lines of the stitched image to compensate for the pivot angle 338. The view rendering module 312 stitches the images of the image streams together at the adjusted boundary lines and blends the images of the image streams along the adjusted boundary line based on the blending coefficient 346 to generate the uniform, seamless image that compensates for the pivot angle 338. The seamless image is the full view 348 of the rear 46 of the vehicle 10 as observed by the cameras 44, in which the trailer is devoid in the view. The view rendering module 312 sets the seamless image as the full view 348 for the UI control module 314. Thus, the view rendering module 312 adjusts the boundaries of the combined images of the image streams to compensate for a turning of the vehicle 10 or trailer 8. This ensures the full view 348 includes the area behind the rear 46 of the vehicle 10 even during movement or pivoting of the trailer 8. Generally, when the vehicle 10 and the trailer 8 are driving straight (pivot angle is substantially zero degrees), the transparent trailer region (the stitched image that renders the trailer 8 transparent in the view) is at the center portion of the full rendered view. When the vehicle 10 and the trailer 8 are turning or driving along a curve on a roadway (pivot angle substantially greater than zero degrees), the transparent trailer region (the stitched image that renders the trailer 8 transparent in the view) shifts to the left or right based on the pivot angle. The corresponding region boundary lines also shift accordingly.

Figure 5C:
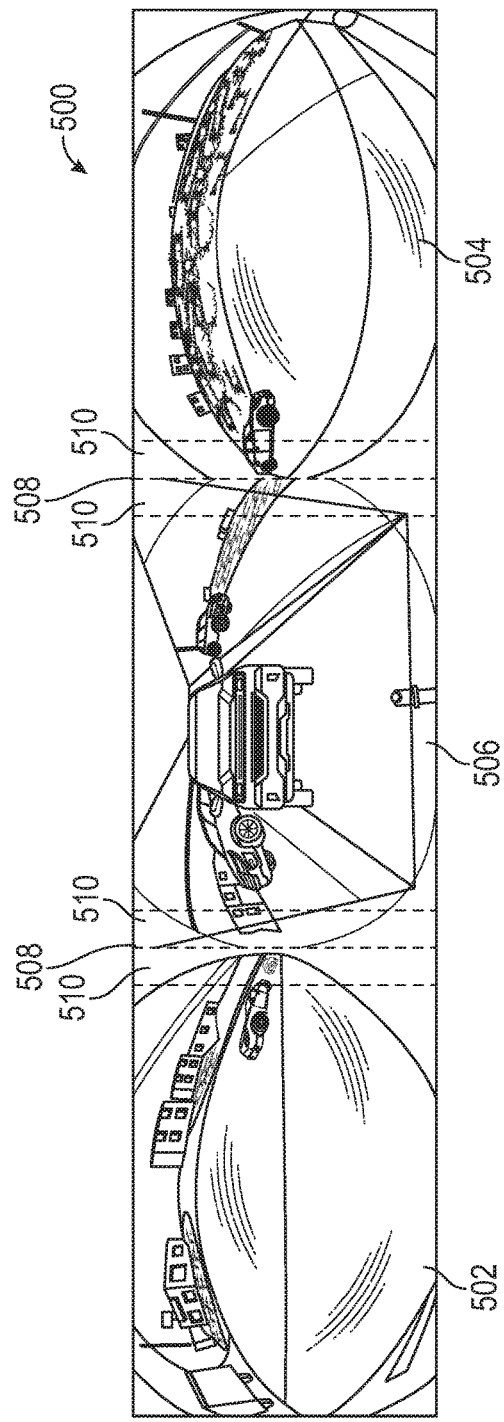
FIG. 5C illustrates exemplary boundary lines and blending zones for an exemplary stitched image generated by the trailer imaging system of the vehicle of FIG. 1, in accordance with various embodiments.

In one example, with reference to FIG. 5C, an exemplary stitched image 500 is shown. In this example, a first image stream 502 is received from one of the cameras 44 coupled to the side mirror of the vehicle 10, and a second image stream 504 is received from the other one of the cameras 44 coupled to the side mirror of the vehicle 10. A third image stream 506 is received from the camera 44 coupled to the rear 70 of the trailer 8. The view rendering module 312 determines the boundary lines 508 between the cameras 44 based on the known coordinate location of the cameras 44 on the vehicle 10 in the vehicle coordinate system and the calibration data 320. The blending coefficient 346 retrieved from the coefficient datastore 310 defines the blending zone or region 510 on either side of the boundary lines 508. The image streams 502, 504, 506 are blended by the view rendering module 312 to result in the uniform, seamless image, which is the full view of the rear 46 of the vehicle 10 devoid of the trailer 8.

With reference to FIG. 3, the view rendering module 312 generates a surround view 354 for rendering on the display 54 that is a substantially 360 degree view of about at least one of the vehicle 10 and the trailer 8 or the connected vehicle 10 and trailer 8 together. By generating a substantially 360 degree view, one or more obstacles may also be detected that are in proximity to the vehicle 10 and/or the trailer 8 by the operator and/or the sensor fusion system 74. As will be discussed, the view rendering module 312 processes the vehicle camera image data 332 from the cameras 44 on the vehicle 10 and the trailer camera image data 330 from the cameras 44 on the trailer 8 to generate the bird-eye substantially 360 degree view, or a top down view, of at least one of the vehicle 10 and the trailer 8. The view rendering module 312 processes the vehicle camera image data 332 and the trailer camera image data 330 to generate a three-dimensional substantially 360 degree view about at least one of the vehicle 10 and the trailer 8.

In various embodiments, the view rendering module 312 receives as input the vehicle camera image data 332 and the trailer camera image data 330. The view rendering module 312 receives as input the calibration data 320. The view rendering module 312 processes the vehicle camera image data 332 and the trailer camera image data 330 based on the calibration data 320 and the known locations of the cameras 44 on the vehicle 10 to determine the areas of overlap in the images of the image streams. Based on the overlap, the view rendering module 312 defines stitching boundary lines. In one example, the stitching boundary lines are defined along the one or more lines created by a perimeter of the overlap.

The view rendering module 312 receives as input the speed data 352. Based on the speed of the vehicle 10, the view rendering module 312 queries the coefficient datastore 310 and retrieves the corresponding blending coefficient 346. The view rendering module 312 stitches the images of the image streams together at the boundary lines and blends the images of the image streams along the boundary line based on the blending coefficient 346 to generate a uniform, seamless image surrounding the vehicle 10 and/or trailer 8. It should be noted that the view rendering module 312 may also blend the images of the image streams based on the overlapping of the field of views of the cameras 44. The seamless image is the surround view 354, which is a view of an environment surrounding the vehicle 10 and/or trailer 8 as captured by the cameras 44. The view rendering module 312 sets the seamless image as the surround view 354 for the UI control module 314.

The view rendering module 312 also receives as input the pivot angle 338. The view rendering module 312 determines whether the pivot angle 338 is greater than zero degrees, which indicates that the trailer 8 is angled relative to the vehicle 10. If true, the view rendering module 312 adjusts the boundary lines of the stitched image to compensate for the pivot angle 338. The view rendering module 312 stitches the images of the image streams together at the adjusted boundary lines and blends the images of the image streams along the adjusted boundary line based on the blending coefficient 346 to generate the uniform, seamless image that compensates for the pivot angle 338. The view rendering module 312 sets the seamless image as the surround view 354 for the UI control module 314. Thus, the view rendering module 312 adjusts the boundaries of the combined images of the image streams to compensate for a turning of the vehicle 10 or trailer 8. This ensures the surround view 354 includes the environment surrounding the vehicle 10 and/or trailer 8 even during movement or pivoting of the trailer 8.

The UI control module 314 generates user interface data 357 for rendering on the display 54. In various embodiments, the UI control module 314 receives as input the full view 348. The UI control module 314 also receives as input obstacle data 356. The obstacle data 356 is a notification that one or more obstacles have been detected in one or more of the trailer camera image data 330 and the vehicle camera image data 332 and may also include a coordinate location of the obstacle. The obstacle data 356 is received from other control modules associated with the vehicle 10, based on data received from one or more of the sensing devices 58a-58n, for example. The UI control module 314 generates transparent trailer view user interface data 358 based on the full view 348 and the obstacle data 356. In this regard, the transparent trailer view user interface data 358 includes the full view 348 for rendering on the display 54. If an obstacle is detected within the trailer camera image data 330 and/or the vehicle camera image data 332, the transparent trailer view user interface data 358 includes a notification overlaid onto the full view 348 to notify the operator of the detected obstacle. In one example, the notification comprises a graphical representation of a caution symbol, and for example, may also include a graphical representation of an arrow that is pointed in the direction of the detected obstacle.

Figure 6A:
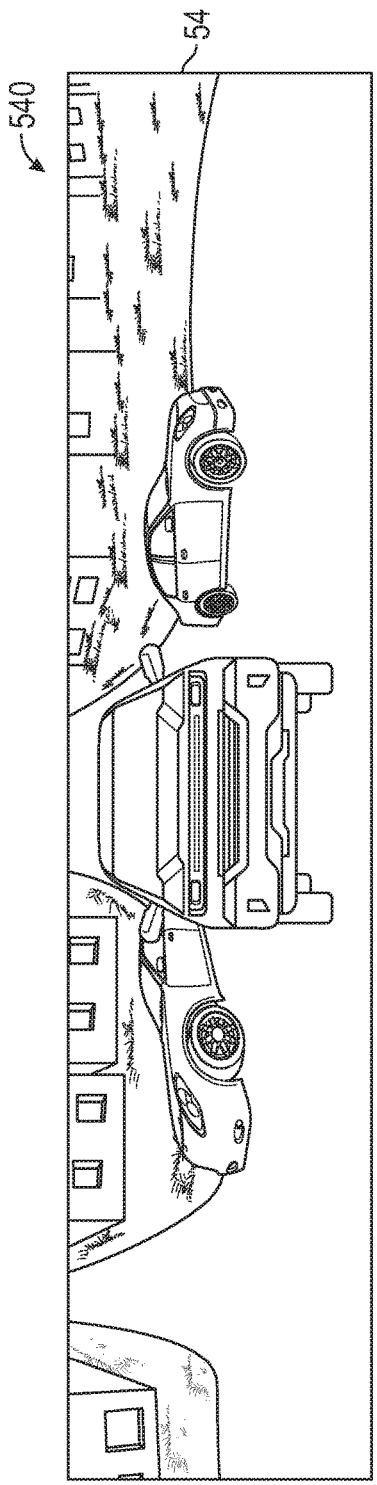
FIG. 6A illustrates an exemplary transparent trailer view user interface rendered on a display of a driver communication system by the trailer imaging system of the vehicle of FIG. 1, in accordance with various embodiments.

With reference to FIG. 6A, an exemplary transparent trailer view user interface 540 is shown rendered on the display 54 based on the transparent trailer view user interface data 358. As shown, the full view 348 provides a full view of the rear 46 of the vehicle 10 as observed by the cameras 44, in which the trailer 8 is devoid in the view.

The UI control module 314 receives as input the surround view 354. The UI control module 314 also receives as input the obstacle data 356. The UI control module 314 generates bird-eye view user interface data 360 based on the surround view 354 and the obstacle data 356. In this regard, the bird-eye view user interface data 360 includes the surround view 354 for rendering on the display 54. If an obstacle is detected within the trailer camera image data 330 and/or the vehicle camera image data 332, the bird-eye view user interface data 360 includes the notification overlaid onto the surround view 354 that notifies the operator of the detected obstacle.

Figure 6B:
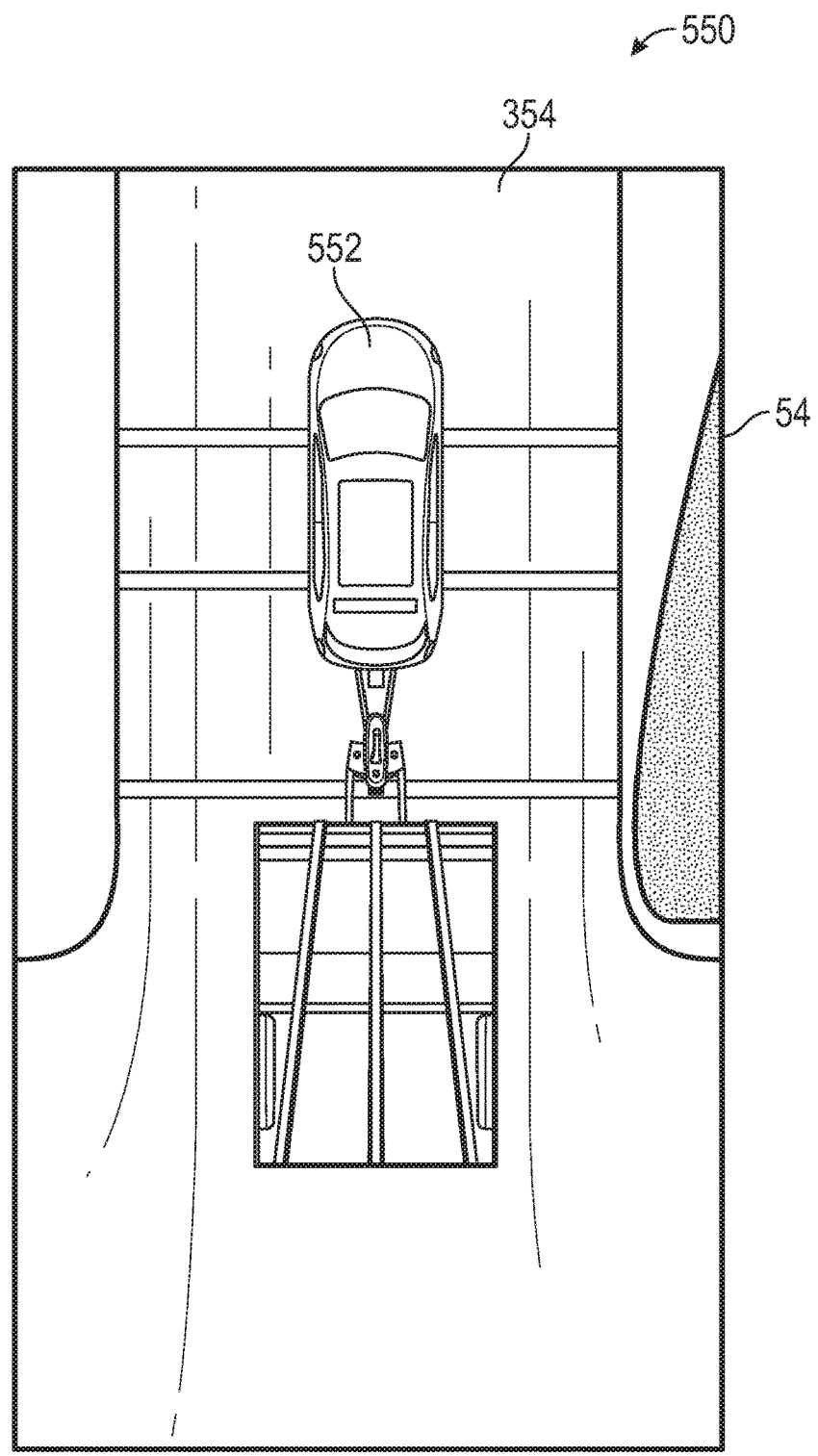
FIG. 6B illustrates an exemplary bird-eye view user interface rendered on a display of a driver communication system by the trailer imaging system of the vehicle of FIG. 1, in accordance with various embodiments.

With reference to FIG. 6B, an exemplary bird-eye user interface 550 is shown rendered on the display 54 based on the bird-eye view user interface data 360. As shown, the surround view 354 provides a view of the environment surrounding the vehicle 10 and/or the trailer 8. A graphical representation 552 of the vehicle 10 may be superimposed over a portion of the surround view 354 to provide context for the view.

With reference back to FIG. 3, the UI control module 314 receives as input the roll alert 344, the pivot alert 340 and the pitch alert 334. Based on at least one of the roll alert 344, the pivot alert 340 and the pitch alert 334, the UI control module 314 generates alert user interface data 362 for rendering on the display 54. The alert user interface data 362 is a graphical and/or textual notification for the operator to check the trailer 8 and/or that a condition of the trailer 8 is outside of an acceptable limit. Thus, the alert user interface data 362 provides one or more graphical and/or textual warning messages for rendering on the display 54. The one or more warning messages may be specific to the particular alert received, such as a warning message that the trailer 8 is rolling above a predefined threshold, a warning message that the trailer 8 is pivoting (e.g. swinging) above a predefined threshold and a warning message that the trailer 8 is pitching (e.g. unbalanced or over a towing capacity of the vehicle 10) above a predefined threshold.

The UI control module 314 also receives as input the pivot angle 338. In various embodiments, the UI control module 314 generates pivot angle user interface data 364 based on the surround view 354 and the pivot angle 338. In this regard, the pivot angle user interface data 364 includes the surround view 354 for rendering on the display 54 with a graphical representation of the pivot angle 338 superimposed over at least a portion of the trailer 8 shown in the surround view 354. In one example, the pivot angle 338 includes one or more dashed lines, which are superimposed over the surround view 354 to graphically indicate the pivot angle 338. In one example, the graphical representation of the pivot angle 338 may start from a position from a hitch ball (identified in the surround view 354 using image processing techniques) and pointing to an orientation determined by the detected pivot angle (from the pivot angle 338), and overlaid on the surround view 354. In addition, it should be noted that the graphical illustration of the pivot angle 338 may be superimposed over other views generated by the view rendering module 312, such as the full view 348, and the surround view 354 is merely an example. Moreover, the pivot angle 338 may be superimposed over the images of the image stream from one of the cameras 44 of the vehicle 10, such as the camera 44 coupled to the rear 46 of the vehicle 10, if desired.

Figure 7:
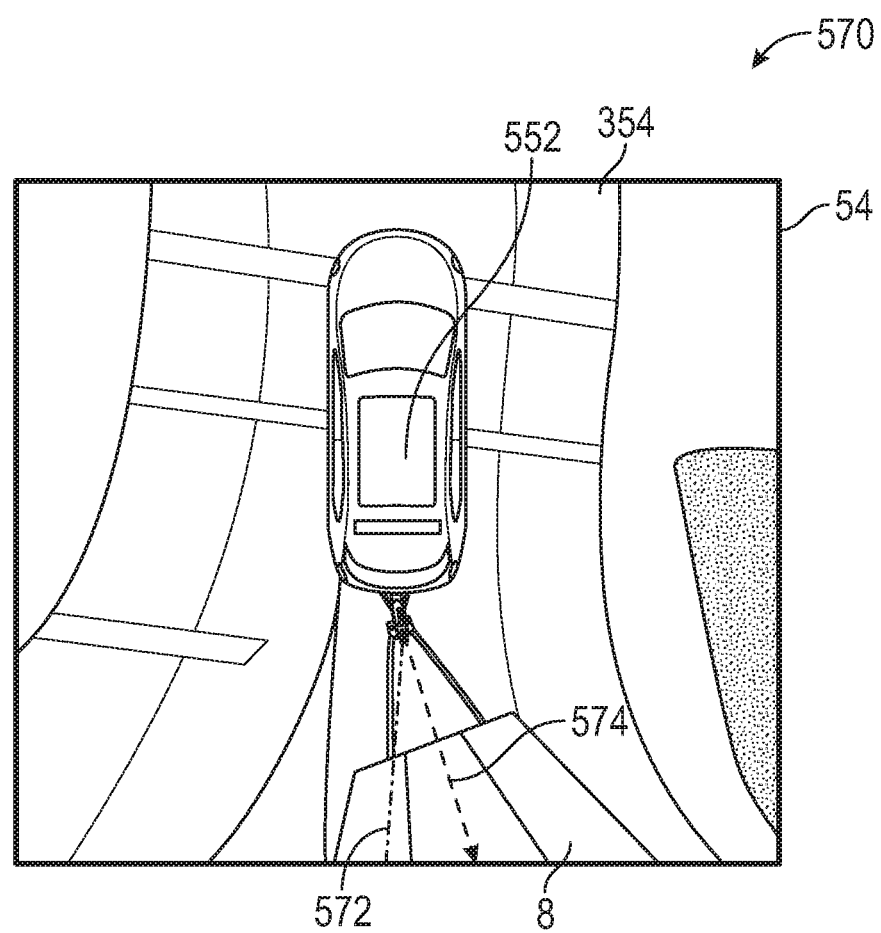
FIG. 7 illustrates a portion of an exemplary bird-eye view user interface rendered on a display of a driver communication system by the trailer imaging system of the vehicle of FIG. 1, which includes a pivot angle user interface rendered on the display overlaid on the portion of the bird-eye user interface view in accordance with various embodiments.

With reference to FIG. 7, an exemplary pivot angle user interface 570 is shown rendered on the display 54 based on the pivot angle user interface data 364. A portion of the surround view 354 is shown and provides a view of the environment surrounding the vehicle 10 and the trailer 8 (the entirety of the surround view 354 is shown in FIG. 6B). A first line 572 graphically represents an axis substantially parallel to the hitch receiver 20 of the vehicle 10, which is superimposed over a portion of the surround view 354. A second line 574 is defined from the axis through the hitch receiver 20 at the pivot angle 338 to graphically represent the pivot angle 338 of the trailer 8. The second line 574 is also superimposed over a portion of the surround view 354.

With reference to FIG. 3, the UI control module 314 receives input data 366. The input data 366 is received from the operator or occupant's interaction with the input device 56. In one example, the input data 366 comprises dimensions of the trailer 8 coupled to the vehicle 10. The UI control module 314 interprets the input data 366 and sets the trailer dimensions 350 for the view rendering module 312.

Figure 8:
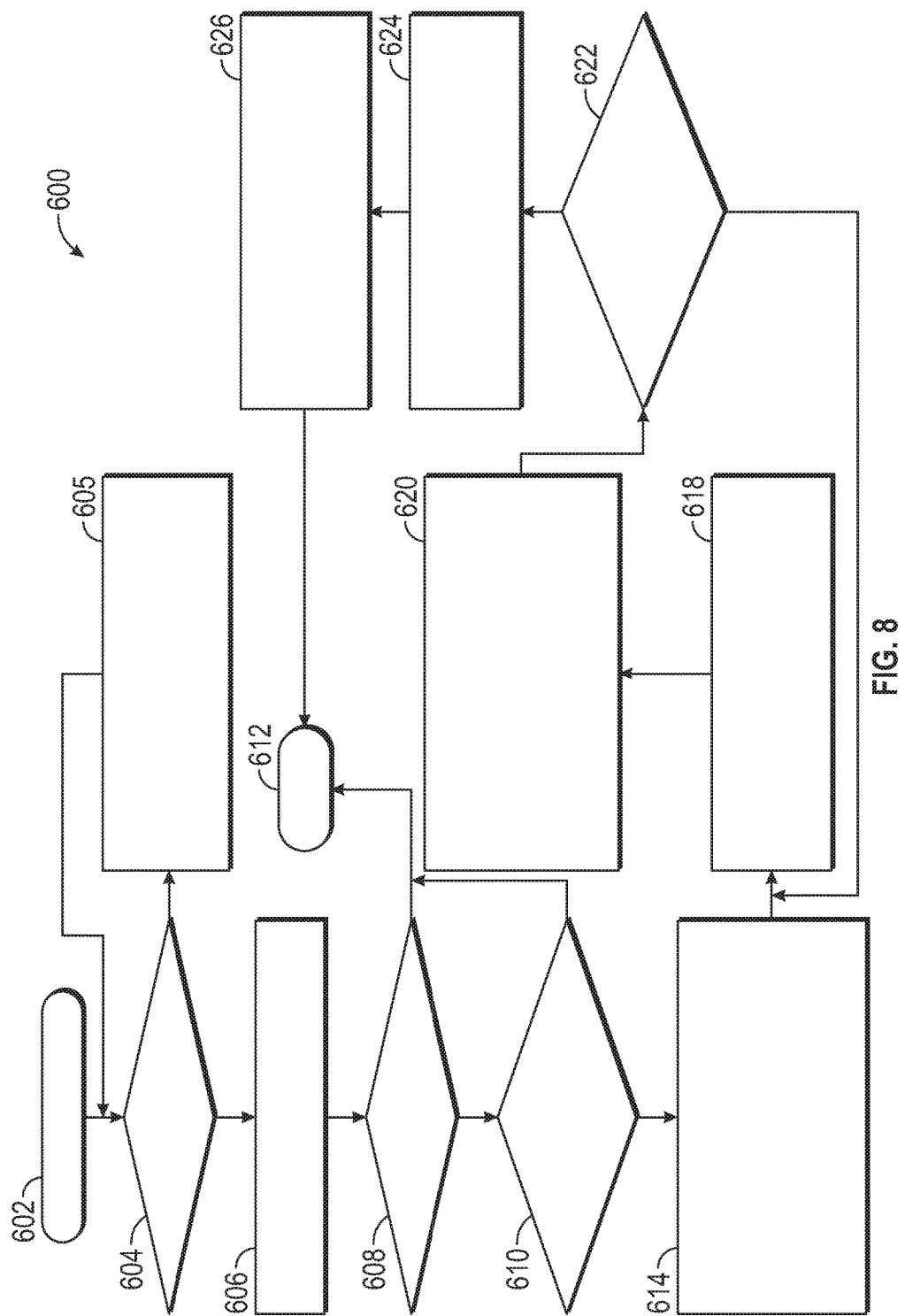
FIGS. 8-13 are flowcharts illustrating various methods performed by the trailer imaging system of the vehicle of FIG. 1, in accordance with various embodiments.

Referring now to FIG. 8, and with continued reference to FIGS. 1-3, a flowchart illustrates a calibration method 600 that can be performed by the trailer imaging system 100 of FIGS. 1-3 in accordance with the present disclosure. In various embodiments, the calibration method 600 is performed by the processor 64 of the controller 40. As can be appreciated in light of the disclosure, the order of operation within the method is not limited to the sequential execution as illustrated in FIG. 8, but may be performed in one or more varying orders as applicable and in accordance with the present disclosure. In various embodiments, the method 600 can be scheduled to run based on one or more predetermined events, and/or can run based on a coupling of the trailer 8 to the vehicle 10.

The method begins at 602. At 604, the method determines whether the trailer 8 is coupled to the vehicle 10. In one example, the method processes the coupler data 324 to determine whether the signal has been received that indicates that the wiring harness of the trailer 8 is coupled to the wiring harness of the vehicle 10. If true, the method proceeds to 606. Otherwise, at 615, the method stores at least one image, such as the image from the camera 44 coupled to the front 45 of the vehicle 10, as the calibration image data 318 in the calibration datastore 300. The method loops to 604.

At 606, the method determines the number of cameras 44 coupled to the trailer 8. In one example, the method determines the number of cameras 44 based on the number of image streams received through the wiring harness. At 608, the method receives and processes the range data 326 to determine whether the vehicle 10 is in the drive range. If true, the method proceeds to 610. Otherwise, the method ends at 612.

At 610, the method determines, based on the vehicle path data 328, whether the vehicle 10 is travelling in a substantially straight path. If true, the method proceeds to 614. Otherwise, the method ends at 612.

At 614, the method receives and processes the image streams from the cameras on the trailer 8 (i.e. the trailer camera image data 330) and the cameras 44 on the vehicle 10 (i.e. the vehicle camera image data 332) to determine areas of overlap between the image streams. In one example, the method samples the image streams of the trailer camera image data 330 and the vehicle camera image data 332 to acquire images. The method compares the acquired images from the vehicle 10 to the acquired images from the trailer 8, and determines overlap between the images.

At 618, the method processes the images that overlap to determine common features in the images of the image streams. In one example, the method processes the acquired images to determine the common features using feature point detection and matching with tracking. At 620, for each common feature, the method estimates a homography matrix between the respective camera 44 of the vehicle 10 and the respective camera 44 of the trailer 8 to determine the distance between each of the cameras 44 and the common features. At 622, the method determines whether the number of distances determined is greater than a predefined threshold. If true, the method proceeds to 624. Otherwise, the method loops to 618.

At 624, based on the determined distances, the method uses triangulation to determine a position and pose of each of the cameras 44 coupled to the trailer 8 and a position of the field of view of each of the cameras 44 coupled to the trailer 8 in the vehicle coordinate system. At 626, the method stores the position of each of the cameras 44 in the vehicle coordinate system in the calibration datastore 300. The method ends at 612.

Figure 9:
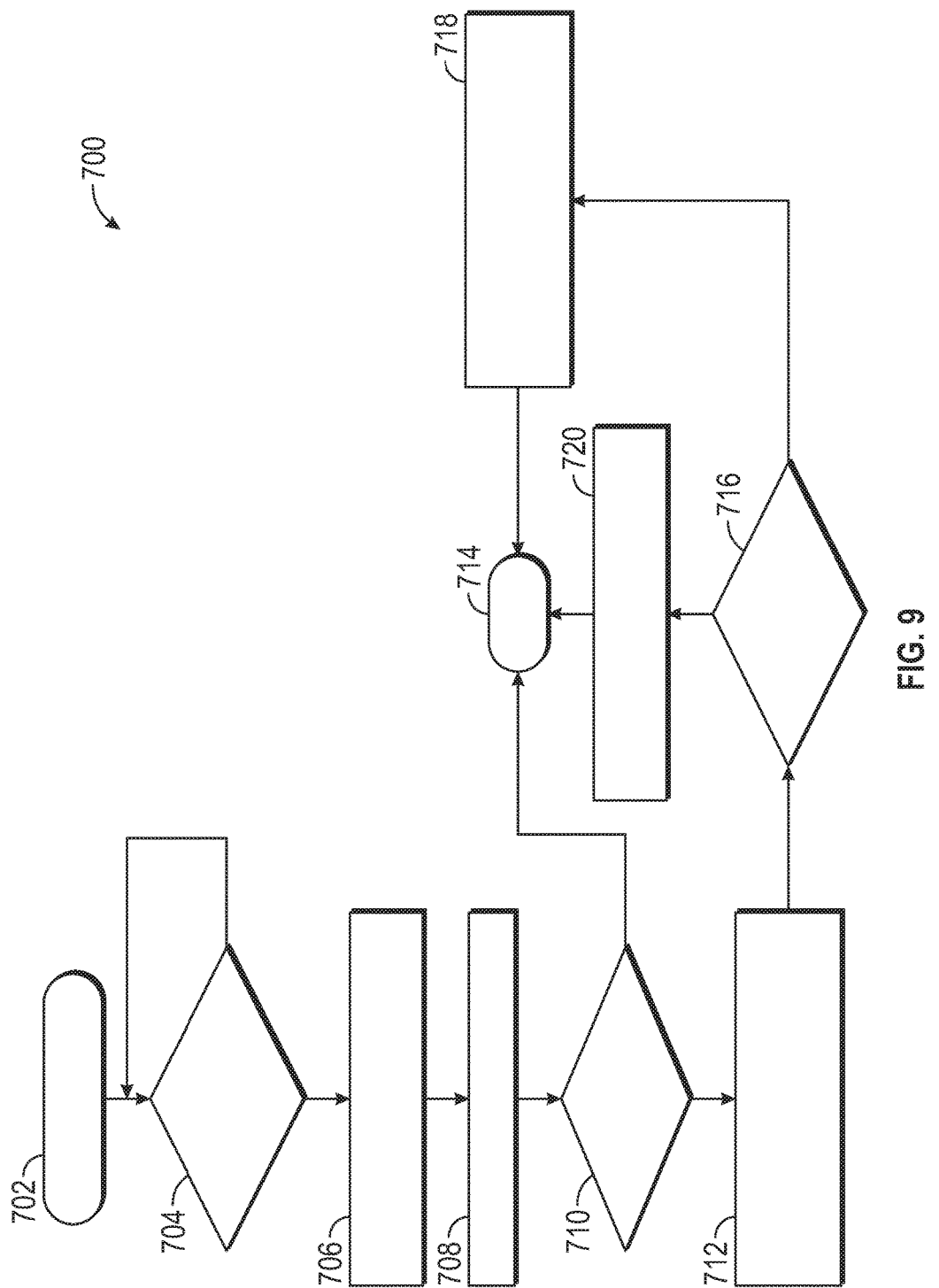

Referring now to FIG. 9, and with continued reference to FIGS. 1-3, a flowchart illustrates a re-calibration method 700 that can be performed by the trailer imaging system 100 of FIGS. 1-3 in accordance with the present disclosure. In various embodiments, the re-calibration method 700 is performed by the processor 64 of the controller 40. As can be appreciated in light of the disclosure, the order of operation within the method is not limited to the sequential execution as illustrated in FIG. 9, but may be performed in one or more varying orders as applicable and in accordance with the present disclosure. In various embodiments, the method 700 can be scheduled to run based on one or more predetermined events, and/or can run based on a re-coupling of the trailer 8 to the vehicle 10.

The method begins at 702. At 704, the method determines whether the trailer 8 is re-coupled to the vehicle 10. For example, the method determines whether a predetermined period of time has passed since a wiring harness was coupled to the wiring harness of the vehicle 10. If true, the method proceeds to 706. Otherwise, the method loops.

At 706, the method retrieves the calibration image data 318 from the calibration datastore 300. At 708, the method samples the camera 44 on the rear 46 of the vehicle 10 to acquire a new image from the image stream. At 710, the method compares the calibration image data 318 to the acquired image to determine whether a horizon position change has occurred in one or more pixels. If true, the method proceeds to 712. Otherwise, the method ends at 714.

At 712, the method queries the tables datastore 302 and retrieves the pitch angle 322 that corresponds with the horizon position change. At 716, the method determines whether the pitch angle 322 is greater than the predefined pitch angle threshold. If true, at 718, the method generates the alert user interface data 362 and outputs the alert user interface data 362 for rendering on the display 54. As discussed, the alert user interface data 362 may comprise one or more warning messages for rendering on the display 54, such as a warning that the trailer 8 is overloaded or unbalanced due to the pitch angle 322 being greater than the pitch angle threshold.

Otherwise, at 716, if the pitch angle 322 is less than the pitch angle threshold, at 720, the method updates the calibration data 320 in the calibration datastore 300 based on the pitch angle 322. In one example, the method updates the known coordinate location for the cameras 44 coupled to the vehicle 10 based on the pitch angle 322. The method ends at 714.

Figure 10:
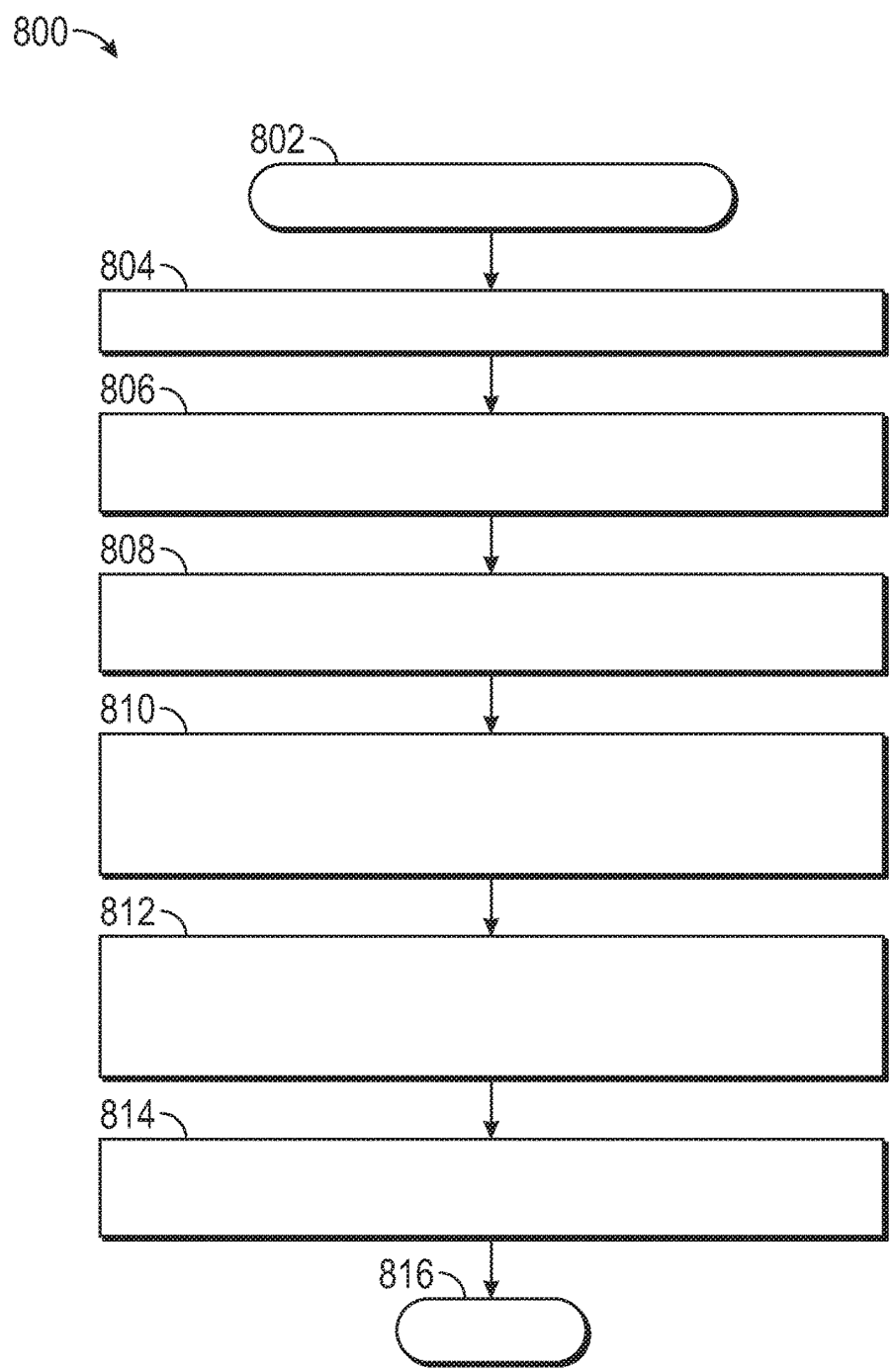

Referring now to FIG. 10, and with continued reference to FIGS. 1-3, a flowchart illustrates a pivot angle estimation method 800 that can be performed by the trailer imaging system 100 of FIGS. 1-3 in accordance with the present disclosure. In various embodiments, the pivot angle estimation method 800 is performed by the processor 64 of the controller 40. As can be appreciated in light of the disclosure, the order of operation within the method is not limited to the sequential execution as illustrated in FIG. 10, but may be performed in one or more varying orders as applicable and in accordance with the present disclosure. In various embodiments, the method 800 can be scheduled to run based on one or more predetermined events, and/or may run continuously during the operation of the vehicle 10.

The method begins at 802. At 804, the method acquires vehicle camera image data 332 from the cameras 44 coupled to the vehicle 10. At 806, the method processes the images of the image streams from the cameras 44 on the vehicle 10 to determine a location of the trailer 8 in the image. At 808, with the location of the trailer 8 in the images of the image stream determined, the method determines feature points or patterns on the drawbar 52 and/or front panel of the trailer 8. At 810, for each feature point or pattern, the method estimates a homography matrix to determine the distance from each of the cameras 44 on the vehicle 10 to the respective feature point or pattern. At 812, based on the determined distances and the known vehicle coordinate location of the cameras 44 on the vehicle 10, the method determines the pivot angle 338 of the trailer 8 relative to the vehicle 10. At 814, the method generates the pivot angle user interface data 364 and outputs the pivot angle user interface data 364 for rendering on the display 54 overlaid onto a view on the display 54, such as the portion of the surround view 354 (as shown in FIG. 8). The method ends at 816.

Figure 11:
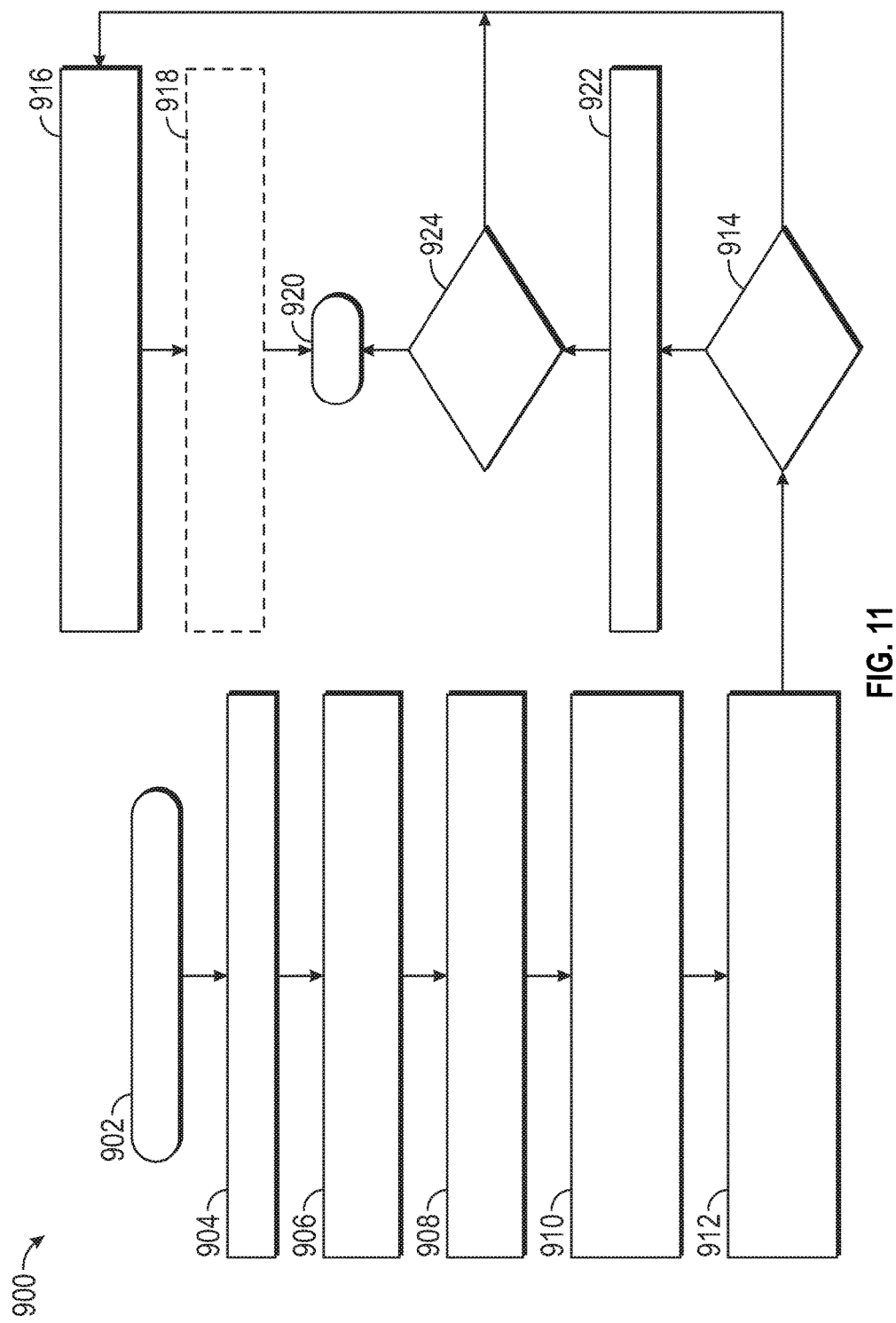

Referring now to FIG. 11, and with continued reference to FIGS. 1-3, a flowchart illustrates a condition(s) estimation method 900 that can be performed by the trailer imaging system 100 of FIGS. 1-3 in accordance with the present disclosure. In various embodiments, the condition(s) estimation method 900 is performed by the processor 64 of the controller 40. As can be appreciated in light of the disclosure, the order of operation within the method is not limited to the sequential execution as illustrated in FIG. 11, but may be performed in one or more varying orders as applicable and in accordance with the present disclosure. In various embodiments, the method 900 can be scheduled to run based on one or more predetermined events, and/or may run continuously during the operation of the vehicle 10.

The method begins at 902. At 904, the method acquires vehicle camera image data 332 from the cameras 44 coupled to the vehicle 10. At 906, the method processes the images of the image streams from the cameras 44 on the vehicle 10 to determine a location of the trailer 8 in the image stream. At 908, with the location of the trailer 8 in the images of the image stream determined, the method determines feature points or patterns on the drawbar 52 and/or front panel of the trailer 8. At 910, for each feature point or pattern, the method estimates a homography matrix to determine the distance from each of the cameras 44 on the vehicle 10 to the respective feature point or pattern. At 912, based on the determined distances and the known vehicle coordinate location of the cameras 44 on the vehicle 10, the method determines the roll angle of the trailer 8 relative to the vehicle 10.

At 914, the method retrieves the roll angle threshold from the threshold datastore 306 and determines whether the roll angle is greater than the predefined roll angle threshold. If true, the method proceeds to 916. At 916, the method generates the alert user interface data 362 and outputs the alert user interface data 362 for rendering on the display 54. As discussed, the alert user interface data 362 may comprise one or more warning messages for rendering on the display 54, such as a warning that the roll angle of the trailer 8 is greater than the roll angle threshold. Optionally, at 918, the method generates and outputs the control signals 342 to the actuator system 36. The method ends at 920.

Otherwise, at 914, if the roll angle is less than the roll angle threshold, the method proceeds to 922. At 922, the method receives the pivot angle 338 determined based on the method of FIG. 10. At 924, the method retrieves the pivot angle threshold from the threshold datastore 306 and determines whether the pivot angle 338 is greater than the predefined pivot angle threshold for the trailer 8. If the pivot angle 338 is less than the predefined pivot angle threshold, the method ends at 920. Otherwise, if pivot angle 338 is greater than a predefined pivot angle threshold, the method proceeds to 916. In this example, the alert user interface data 362 may comprise one or more warning messages for rendering on the display 54, such as a warning that the pivot angle of the trailer 8 is greater than the pivot angle threshold.

Figure 12:
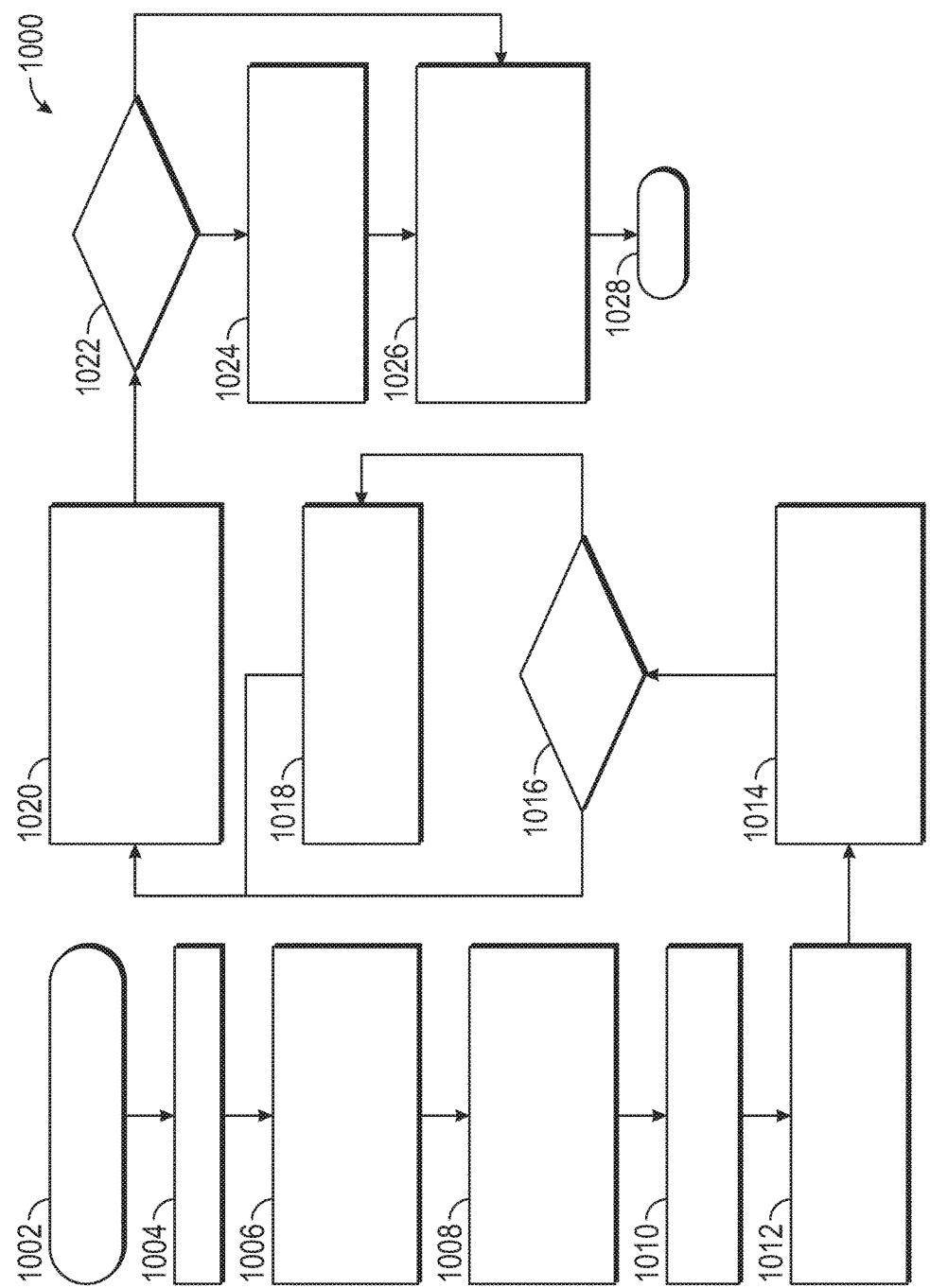

Referring now to FIG. 12, and with continued reference to FIGS. 1-3, a flowchart illustrates a transparent trailer view rendering method 1000 that can be performed by the trailer imaging system 100 of FIGS. 1-3 in accordance with the present disclosure. In various embodiments, the transparent trailer view rendering method 1000 is performed by the processor 64 of the controller 40. As can be appreciated in light of the disclosure, the order of operation within the method is not limited to the sequential execution as illustrated in FIG. 12, but may be performed in one or more varying orders as applicable and in accordance with the present disclosure. In various embodiments, the method 1000 can be scheduled to run based on one or more predetermined events, and/or may run continuously during the operation of the vehicle 10.

The method begins at 1002. At 1004, the method acquires the trailer camera image data 330 from the cameras 44 on the trailer 8 and the vehicle camera image data 332 from the cameras 44 on the vehicle 10. At 1006, the method determines a size of the view that contains the trailer 8, based on the trailer dimensions 350 received as input from the input device 56. Generally, to accommodate different trailer sizes, the method needs to determine the region in the image data from the cameras 44 on the vehicle 10 that contains the trailer 8. In one example, the method determines the size of the image that contains the trailer 8 based on detecting the trailer region in the image from the camera 44 coupled to the rear 46 of the vehicle 10, which may be assisted by receiving the trailer dimensions 350 as input. In addition, the pivot angle 338 may also assist in determining the size of the image that contains the trailer 8. At 1008, based on the calibration data 320 and the known locations (position and pose) of the cameras 44 on the vehicle 10, the method processes the trailer camera image data 330 and the vehicle camera image data 332 to determine areas of overlap in the images of the image streams.

At 1010, based on the areas of overlap, the method defines the stitching boundary lines. In one example, the stitching boundary lines are defined by the perimeter of an area of overlap. At 1012, the method receives the speed data 352, which indicates the speed of the vehicle 10, and queries the coefficient datastore 310 to retrieve the blending coefficient 346 that corresponds with the vehicle speed. At 1014, the method determines the blending zones around the stitching boundary lines based on the retrieved blending coefficient 346. At 1016, the method determines whether the pivot angle 338 (determined as discussed with regard to FIG. 10) is greater than zero degrees. If true, the method proceeds to 1018. Otherwise, the method proceeds to 1020.

At 1018, the method adjusts the boundary lines of the stitched image to compensate for the pivot angle 338. At 1020, the method stitches the images of the image streams in the trailer camera image data 330 and the vehicle camera image data 332 along the boundary lines and blends the images of the image streams in the blending zones defined by the retrieved blending coefficient 346 to generate a uniform, seamless image stream. At 1022, the method determines whether an obstacle is detected in the trailer camera image data 330 and/or the vehicle camera image data 332 based on the obstacle data 356. If true, at 1024, the method overlays the notification of the obstacle on the seamless image of the view. At 1026, the method generates the transparent trailer view user interface data 358, which includes the seamless image of the view behind the rear 46 of the vehicle 10, and outputs the transparent trailer view user interface data 358 for rendering on the display 54. The method ends at 1028. Thus, after detecting the trailer region in the vehicle camera image data 332 and the field of view blocked by the trailer 8, images from the cameras 44 on the trailer 8 are captured and processed to extract the scene from the field of view blocked by the trailer 8 and filled/blended into the transparent trailer view user interface data 358.

Figure 13:
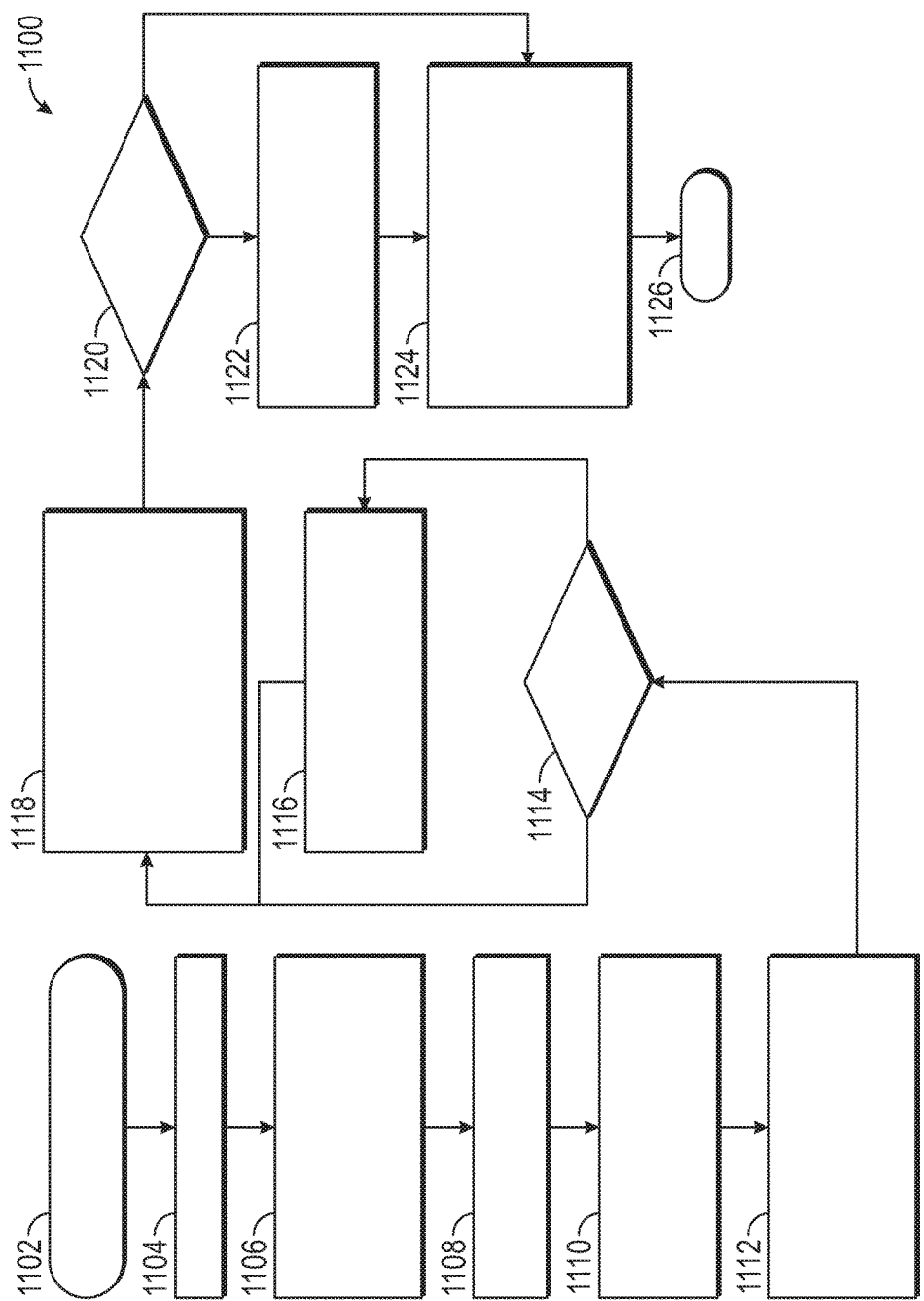

Referring now to FIG. 13, and with continued reference to FIGS. 1-3, a flowchart illustrates a surround view or 360 degree view rendering method 1100 that can be performed by the trailer imaging system 100 of FIGS. 1-3 in accordance with the present disclosure. In various embodiments, the surround view rendering method 1100 is performed by the processor 64 of the controller 40. As can be appreciated in light of the disclosure, the order of operation within the method is not limited to the sequential execution as illustrated in FIG. 13, but may be performed in one or more varying orders as applicable and in accordance with the present disclosure. In various embodiments, the method 1100 can be scheduled to run based on one or more predetermined events, and/or may run continuously during the operation of the vehicle 10.

The method begins at 1102. At 1104, the method acquires the trailer camera image data 330 from the cameras 44 on the trailer 8 and the vehicle camera image data 332 from the cameras 44 on the vehicle 10. At 1106, based on the calibration data 320 and the known locations (position and pose) of the cameras 44 on the vehicle 10, the method processes the trailer camera image data 330 and the vehicle camera image data 332 to determine areas of overlap in the images of the image streams.

At 1108, based on the areas of overlap, the method defines the stitching boundary lines. In one example, the stitching boundary lines are defined by the perimeter of an area of overlap. At 1110, the method receives the speed data 352, which indicates the speed of the vehicle 10, and queries the coefficient datastore 310 to retrieve the blending coefficient 346 that corresponds with the vehicle speed. At 1112, the method determines the blending area or zones around the stitching boundary lines based on the retrieved blending coefficient 346. At 1114, the method determines whether the pivot angle 338 (determined as discussed with regard to FIG. 10) is greater than zero degrees. If true, the method proceeds to 1116. Otherwise, the method proceeds to 1118.

At 1116, the method adjusts the boundary lines of the stitched image to compensate for the pivot angle 338. At 1118, the method stitches the images of the image streams in the trailer camera image data 330 and the vehicle camera image data 332 along the boundary lines and blends the images of the image streams in the blending zones defined by the retrieved blending coefficient 346 to generate a uniform, seamless image stream. At 1120, the method determines whether an obstacle is detected in the trailer camera image data 330 and/or the vehicle camera image data 332 based on the obstacle data 356. If true, at 1122, the method overlays the notification of the obstacle on the seamless image of the view. At 1124, the method generates the bird-eye view user interface data 360, which includes the seamless image of the view surrounding the vehicle 10 and/or trailer 8, and outputs the bird-eye view user interface data 360 for rendering on the display 54. The method ends at 1126.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for a towing vehicle towing a trailer having at least one imaging device, comprising:
receiving, from a first imaging device coupled to the trailer, a first image stream having a plurality of first images;
receiving, from a second imaging device coupled to the towing vehicle, a second image stream having a plurality of second images;
determining, by a processor onboard the towing vehicle, at least one common feature between a first image of the plurality of first images and a second image of the plurality of second images;
determining, by the processor onboard the towing vehicle, a first distance from the first imaging device coupled to the trailer to the at least one common feature and a second distance from the second imaging device coupled to the towing vehicle to the at least one common feature; and
determining, by the processor onboard the towing vehicle, a position of the first imaging device relative to the towing vehicle based on the first distance, the second distance and a known position and pose of the second imaging device on the towing vehicle.

2. The method of claim 1, further comprising:
determining, by the processor onboard the towing vehicle, whether the towing vehicle is in a drive range and determining, by the processor onboard the towing vehicle, whether the towing vehicle is traveling along a substantially straight path prior to determining the at least one common feature.

3. The method of claim 1, further comprising:
determining, by the processor onboard the towing vehicle, whether the trailer is coupled to the towing vehicle; and
based on the determination, storing, by the processor onboard the towing vehicle, a calibration image from the second image stream in a datastore.

4. The method of claim 3, further comprising:
determining, by the processor onboard the towing vehicle, whether the trailer is re-coupled to the towing vehicle;
based on the determination that the trailer is re-coupled to the towing vehicle:
retrieving the calibration image from the datastore;
acquiring a third image from the plurality of second images in the second image stream;
comparing, by the processor onboard the towing vehicle, the calibration image to the third image to determine a horizon position change between one or more pixels in the calibration image and the third image;
retrieving, by the processor onboard the towing vehicle, a pitch angle associated with the horizon position change from a tables datastore;
determining, by the processor onboard the towing vehicle, the pitch angle is less than a pitch angle threshold; and
updating the known position of the second imaging device based on the pitch angle.

5. The method of claim 1, wherein the second imaging device includes a plurality of second cameras coupled to the towing vehicle each having a respective second image stream, the method further comprising:
processing, by the processor onboard the towing vehicle, the plurality of second images from the plurality of second image streams to determine a location of the trailer within one or more of the plurality of second images;
determining, by the processor onboard the towing vehicle, one or more feature points or patterns on a drawbar or a panel of the trailer in the one or more of the plurality of second images;
determining, by the processor onboard the towing vehicle, a third distance from one of the second cameras to the one or more feature points or patterns and a fourth distance from another one of the second cameras to the one or more feature points or patterns; and
determining, by the processor onboard the towing vehicle, a pivot angle of the trailer relative to the towing vehicle based on the third distance, the fourth distance and a known position of the plurality of second cameras on the towing vehicle.

6. The method of claim 5, further comprising:
generating a pivot angle user interface for rendering on a display associated with the towing vehicle that graphically indicates the pivot angle of the trailer relative to the towing vehicle.

7. The method of claim 6, further comprising:
determining, by the processor onboard the towing vehicle, that the pivot angle is greater than a pivot angle threshold; and
generating an alert user interface for rendering on the display associated with the towing vehicle based on the pivot angle as greater than the pivot angle threshold.

8. The method of claim 7, further comprising:
generating, by the processor onboard the towing vehicle, one or more control signals to an actuator system associated with the towing vehicle to control one or more actuators of a component of the towing vehicle based on the pivot angle.

9. The method of claim 1, wherein the second imaging device includes a plurality of second cameras coupled to the towing vehicle each having a respective second image stream, the method further comprising:
processing, by the processor onboard the towing vehicle, the plurality of second images from the plurality of second image streams to determine a location of the trailer within one or more of the plurality of second images;
determining, by the processor onboard the towing vehicle, feature points or patterns on a drawbar or a panel of the trailer in the one or more of the plurality of second images;
determining, by the processor onboard the towing vehicle, a fifth distance from one of the second cameras to the feature point or pattern and a sixth distance from another one of the second cameras to the feature point or pattern; and
determining, by the processor onboard the towing vehicle, a roll angle of the trailer relative to the towing vehicle based on the fifth distance, the sixth distance and a known position of the plurality of second cameras on the towing vehicle.

10. The method of claim 9, further comprising:
determining, by the processor onboard the towing vehicle, that the roll angle is greater than a roll angle threshold;
generating an alert user interface for rendering on a display associated with the towing vehicle based on the roll angle as greater than the roll angle threshold; and
generating, by the processor onboard the towing vehicle, one or more control signals to an actuator system associated with the towing vehicle to control one or more actuators of a component of the towing vehicle based on the roll angle.

11. The method of claim 1, further comprising:
determining, based on the position of the first imaging device relative to the towing vehicle and the known position and pose of the second imaging device on the towing vehicle, an area of overlap of at least one of the plurality of first images with at least one of the plurality of second images;
defining one or more boundary lines based on the area of overlap;
determining, based on a speed of the towing vehicle, a blending coefficient that defines a blending zone around the one or more boundary lines;
stitching, by the processor onboard the towing vehicle, the at least one of the plurality of first images and the at least one of the plurality of second images along the one or more boundary lines and blending the at least one of the plurality of first images and the at least one of the plurality of second images in the blending zone to generate a seamless image of a full view of a rear of the towing vehicle devoid of the trailer; and
generating, by the processor onboard the towing vehicle, a user interface that includes the full view for rendering on a display associated with the towing vehicle.

12. The method of claim 1, further comprising:
determining, based on the position of the first imaging device relative to the towing vehicle and the known position and pose of the second imaging device on the towing vehicle, an area of overlap of at least one of the plurality of first images with at least one of the plurality of second images;
defining one or more boundary lines based on the area of overlap;
determining, based on a speed of the towing vehicle, a blending coefficient that defines a blending zone around the one or more boundary lines;
stitching, by the processor onboard the towing vehicle, the at least one of the plurality of first images and the at least one of the plurality of second images along the one or more boundary lines and blending the at least one of the plurality of first images and the at least one of the plurality of second images in the blending zone to generate a seamless image of a surround view of an environment surrounding the towing vehicle and the trailer; and
generating, by the processor onboard the towing vehicle, a user interface that includes the surround view for rendering on a display associated with the towing vehicle.

13. A system for a towing vehicle towing a trailer having at least one imaging device, comprising:
a first imaging device coupled to the trailer that provides a first image stream having a plurality of first images;
a second imaging device coupled to the towing vehicle that provides a second image stream having a plurality of second images;
a controller onboard the towing vehicle in communication with the first imaging device and the second imaging device, the controller having a processor that is configured to:
determine, based on a calibrated position of the first imaging device relative to the towing vehicle and a known position and pose of the second imaging device on the towing vehicle, an area of overlap of at least one of the plurality of first images with at least one of the plurality of second images;
define one or more boundary lines based on the area of overlap;
determine, based on a speed of the towing vehicle, a blending coefficient that defines a blending zone around the one or more boundary lines;
stitch the at least one of the plurality of first images and the at least one of the plurality of second images along the one or more boundary lines and blends the at least one of the plurality of first images and the at least one of the plurality of second images in the blending zone to generate a seamless image of a surround view of an environment surrounding the towing vehicle and the trailer; and
generate a user interface that includes the surround view for rendering on a display associated with the towing vehicle.

14. The system of claim 13, wherein the controller is configured to stitch the at least one of the plurality of first images and the at least one of the plurality of second images along the one or more boundary lines and to blend the at least one of the plurality of first images and the at least one of the plurality of second images in the blending zone to generate a seamless image of a full view of a rear of the towing vehicle devoid of the trailer and to generate a user interface that includes the full view for rendering on the display associated with the towing vehicle.

15. The system of claim 13, wherein the controller is configured to determine at least one common feature between a first image of the plurality of first images and a second image of the plurality of second images, to determine a first distance from the first imaging device coupled to the trailer to the at least one common feature and a second distance from the second imaging device coupled to the towing vehicle to the at least one common feature and to determine the calibrated position of the first imaging device relative to the towing vehicle based on the first distance, the second distance and a known position of the second imaging device on the towing vehicle.

16. The system of claim 13, wherein the second imaging device includes a plurality of second cameras coupled to the towing vehicle each having a respective second image stream, each second camera of the plurality of second cameras having a known position and pose, and the controller is configured to:
  process the plurality of second images from the plurality of second image streams to determine a location of the trailer within one or more of the plurality of second images;
  determine one or more feature points or patterns on a drawbar or a panel of the trailer in the one or more of the plurality of second images;
  determine a third distance from one of the second cameras to the one or more feature points or patterns and a fourth distance from another one of the second cameras to the one or more feature points or patterns; and
  determine a pivot angle of the trailer relative to the towing vehicle based on the third distance, the fourth distance and the known position and pose of the plurality of second cameras on the towing vehicle.

17. The system of claim 16, wherein the controller is configured to:
  determine that the pivot angle is greater than a pivot angle threshold;
  generate an alert user interface for rendering on the display based on the pivot angle as greater than the pivot angle threshold; and
  generate one or more control signals to an actuator system associated with the towing vehicle to control one or more actuators of a component of the towing vehicle based on the pivot angle.

18. A towing vehicle for coupling to a trailer and towing a trailer, having a trailer imaging system, the towing vehicle comprising:
  a source of a first image stream having a plurality of first images from a first camera coupled to the trailer;
  a second camera coupled to the towing vehicle that provides a second image stream having a plurality of second images;
  a controller in communication with the first camera and the second camera, the controller having a processor that is configured to:
    determine at least one common feature between a first image of the plurality of first images and a second image of the plurality of second images;
    determine a first distance from the first camera coupled to the trailer to the at least one common feature and a second distance from the second camera coupled to the towing vehicle to the at least one common feature; and
    determine a position of the first camera relative to the towing vehicle based on the first distance, the second distance and a known position and pose of the second camera on the towing vehicle,
  wherein based on the position of the first camera and the known position and pose of the second camera, the controller is configured to at least one of generate a seamless image of a surround view of an environment surrounding the towing vehicle and the trailer, and generate a seamless image of a full view of a rear of the towing vehicle devoid of the trailer.

19. The towing vehicle of claim 18, wherein the controller is configured to:
  determine an area of overlap in at least one of the plurality of first images and at least one of the plurality of second images;
  define one or more boundary lines based on the area of overlap;
  determine, based on a speed of the towing vehicle, a blending coefficient that defines a blending zone around the one or more boundary lines;
  stitch the at least one of the plurality of first images and the at least one of the plurality of second images along the one or more boundary lines and blends the at least one of the plurality of first images and the at least one of the plurality of second images in the blending zone to generate the seamless image of the surround view of the environment surrounding the towing vehicle and the trailer; and
  generate a user interface that includes the surround view for rendering on a display associated with the towing vehicle.

20. The towing vehicle of claim 18, wherein the controller is configured to stitch the at least one of the plurality of first images and the at least one of the plurality of second images along the one or more boundary lines and to blend the at least one of the plurality of first images and the at least one of the plurality of second images in the blending zone to generate the seamless image of the full view of the rear of the towing vehicle devoid of the trailer, and to generate a user interface that includes the full view for rendering on the display.

* * * * *